United States Patent [19]

Boys

[11] 4,295,189

[45] Oct. 13, 1981

[54] APPARATUS AND METHOD FOR GENERATING WAVEFORMS WHICH ARE PARTICULARLY SUITABLE FOR A PWM-DRIVEN MOTOR

[75] Inventor: John T. Boys, Auckland, New Zealand

[73] Assignee: The University of Auckland, Auckland, New Zealand

[21] Appl. No.: 99,998

[22] Filed: Dec. 4, 1979

[51] Int. Cl.³ .............................................. H02M 1/08
[52] U.S. Cl. ........................................ 363/41; 363/96; 307/265; 318/811; 328/21
[58] Field of Search ..................... 363/40–43, 363/95, 96, 135–138; 318/799–802, 807, 811; 307/260–261, 265, 269, 271; 328/13–15, 21–22, 181, 185

[56] References Cited

U.S. PATENT DOCUMENTS

| | | | |
|---|---|---|---|
| 2,580,673 | 1/1952 | Graham | 328/21 X |
| 3,569,805 | 3/1971 | Hammond | 318/811 |
| 3,624,486 | 11/1971 | Oates | 363/41 X |
| 3,916,285 | 10/1975 | Iwata et al. | 363/41 |
| 4,099,109 | 7/1978 | Abbondanti | 307/265 X |

Primary Examiner—William M. Shoop
Assistant Examiner—Peter S. Wong
Attorney, Agent, or Firm—Aaron Nerenberg

[57] ABSTRACT

A triangle waveform having substantially linearly sloped, gradually increasing and decreasing edges and having a frequency nf is generated from an n-phase sine wave signal, each phase having a fundamental frequency f. A segment of any of the n-phases of the sine wave is detected when that segment is within a predetermined angular amount from a reference crossing level, such as the zero crossing of the sine wave signal. Successive ones of the detected segments are selected to synthesize the triangle waveform. In the preferred use of this invention, the triangle waveform is compared to a reference signal, such as the sine wave signal from which the triangle waveform is generated, this reference signal having a controllable frequency and amplitude. Pulse transitions are generated at the intersection of the triangle waveform and each of the respective phases of the reference signal.

In one embodiment of this invention, the frequency of the triangle waveform is increased by an amplitude-folding technique wherein the triangle waveform (of frequency nf) is folded about a pair of equal but opposite folding levels whenever the triangle waveform reaches either of these levels, so as to produce an amplitude-folded triangle waveform of frequency mf and of peak levels determined by the folding levels.

32 Claims, 23 Drawing Figures

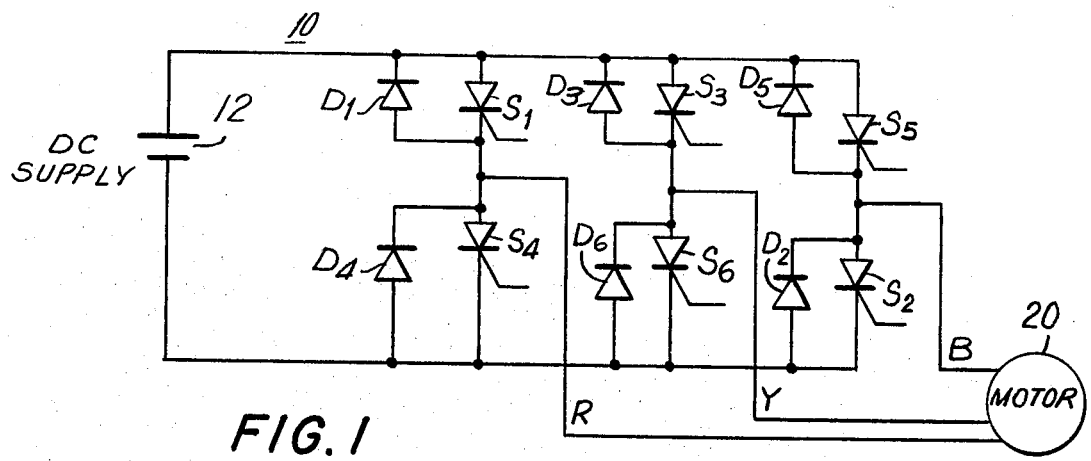
FIG. 1
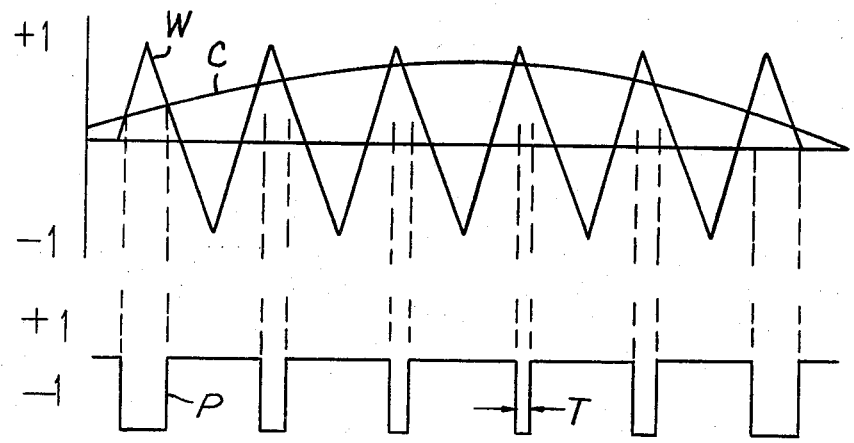
FIG. 2A
FIG. 2B
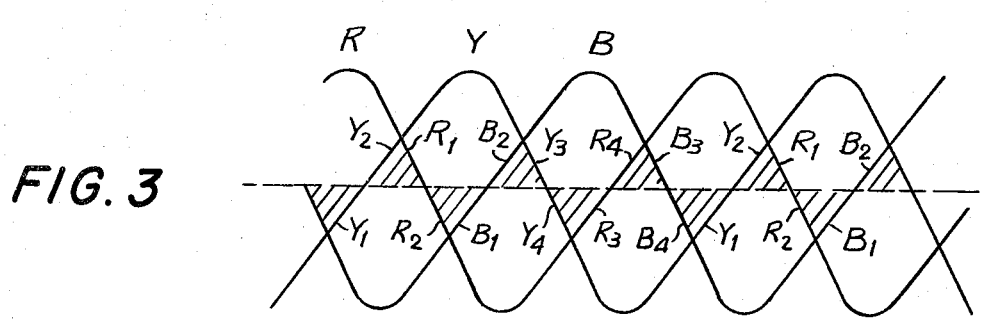
FIG. 3

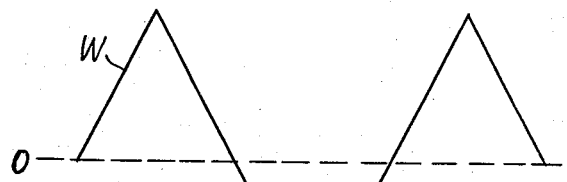
FIG. 12A
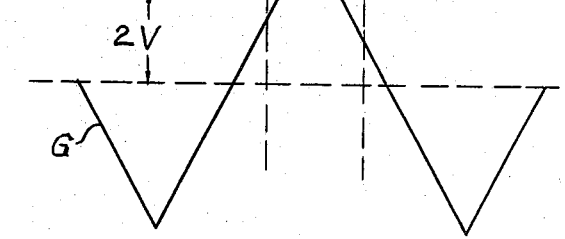
FIG. 12B
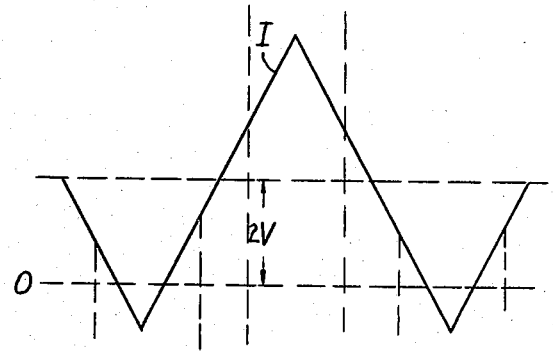
FIG. 12C
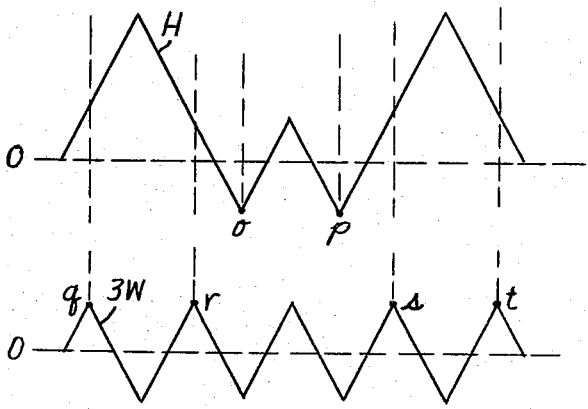
FIG. 12D
FIG. 12E

APPARATUS AND METHOD FOR GENERATING WAVEFORMS WHICH ARE PARTICULARLY SUITABLE FOR A PWM-DRIVEN MOTOR

BACKGROUND OF THE INVENTION

This invention relates to the generation of waveforms which are particularly useful in PWM-driven motors and, more particularly, to the generation of triangle waveforms which are synthesized from a reference n-phase sine wave signal.

In the motor control art, it is conventional to drive an AC motor from an inverter which, typically, is provided with silicon-controlled rectifiers (SCR's) which function as switches that respond to control signals to supply drive currents to the motor. For example, a basic inverter circuit for driving a 3-phase motor is provided with a pair of SCR's for each phase. When one SCR in a particular phase is energized, or turned ON, DC current flows to the corresponding motor phase in a first direction; and when the other SCR in that pair is turned ON, DC current flows to this motor phase in the opposite direction. Control circuits are connected to the inverter so as to energize the respective pairs of SCR's sequentially and in the proper order such that the appropriate motor phases are supplied with positive and negative DC currents in a repetitive manner. Thus, direct current is switched by the inverter so as to drive the 3-phase AC motor.

One type of inverter that has been used advantageously is the so-called pulse width modulated (PWM) inverter. In the PWM inverter, the SCR's are turned ON and OFF in response to pulse width modulated control pulses. As the frequency of these PWM pulses increases, the rate at which the SCR's turn ON and OFF also increases. The duration of each PWM pulse determines the amount of current that is supplied to the motor by the SCR; and this duration may be a function of the amplitude of a reference signal which is used to control the motor.

One type of known PWM generator which has been used to supply PWM signals to the inverter operates by comparing a triangle waveform to a reference signal. A pulse signal is generated in accordance with each intersection of the triangle waveform and reference signal. For example, when the rising edge (i.e. positively sloped edge) crosses the reference signal, the leading edge of the pulse is generated, and when the falling edge (i.e. the negatively sloped edge) crosses the reference signal, the trailing edge of the pulse is generated. The polarity of the pulse, that is, whether the pulse appears as a positive-going or a negative-going pulse, is determined as a function of the polarity of the reference signal.

One technique for generating the triangle waveform is described in U.S. Pat. No. 3,624,486. In this patent, a digital circuit generates a rectangular wave signal of desired frequency, and this rectangular wave signal charges and discharges a capacitor. As the capacitor charges, the positively sloped edge of triangle waveform is produced; and as the capacitor discharges, the negatively sloped edge of the triangle waveform is produced. The frequency of the triangle waveform is equal to the frequency of the rectangular wave signal. Consequently, as the rectangular wave frequency increases, the capacitor does not have sufficient time to charge to a higher level, thereby resulting in a triangle waveform of reduced amplitude. Conversely, as the rectangular wave frequency decreases, the amplitude of the triangle waveform increases. A PWM signal is produced, in accordance with this patent, by comparing the variable amplitude triangle waveform with another rectangular wave reference signal. However, since the pulse duration of the PWM signal is a function of the amplitude of the triangle waveform which, in turn, is dependent upon the frequency of the rectangular wave signal from which the triangle waveform is generated, and also is a function of the amplitude of the rectangular wave reference signal, it is difficult to obtain good control over the PWM signal. For this reason, use of this patent is best restricted to generating a PWM signal of a substantially constant frequency. This means that, if the PWM signal is used to drive an AC motor, this motor must be driven at a substantially constant speed.

It is, of course, desirable to control the speed at which the motor is driven. When a motor is driven at a lower speed, the SCR's included in the inverter are switched at a relatively lower frequency. Conversely, these SCR's are switched at a relatively higher frequency when the motor is driven at a higher speed. There is an upper limit on the frequency at which the SCR's can be driven. Generally, this upper limit is on the order of about 400 Hz. It is advantageous, as described in U.S. Pat. No. 3,916,285, to operate the SCR's in the vicinity of its higher frequency limit for all motor speeds. Thus, for lower speeds, it is necessary that the triangle waveform which is used to generate the PWM pulses exhibit a higher frequency, for example, about three times the frequency of the triangle waveform which is used to generate the PWM pulses at higher motor speeds. The purpose of the higher triangle wave frequency is to increase the order of the harmonic component which would be included in the PWM pulse signal. One difficulty associated with unwanted harmonics of the PWM signal is that harmonic currents flow through the motor, thereby increasing copper losses therein. Such harmonic currents are limited by the leakage inductance of the motor and, as appreciated, the magnitudes of these currents are inversely related to their harmonic frequencies. That is, if the harmonic frequency of the current is high, the magnitude of that current is maintained at a lower amplitude.

It has been proposed, in U.S. Pat. No. 4,047,083, to use a sine wave signal as the reference signal to which the triangle waveform is compared for producing the PWM inverter drive pulses. Motor speed control is attained by controlling the frequency and amplitude of this sine wave reference signal. According to this patent, it is desirable that a relatively high "chopping ratio" be maintained. The chopping ratio is the ratio of the frequency of the triangle waveform to the frequency of the sine wave signal. With a high chopping ratio, that is, a chopping ratio that is greater than six, the residual harmonics in the PWM signal have a high order and, thus, little influence on motor operation. Harmonic distortion in the output voltage waveform is relatively low.

This patent also recognizes the problem of low frequency "beats" due to unwanted subharmonic components. These subharmonic components may be present if the triangle waveform is not precisely synchronized with the sine wave signal. For example, if the triangle wave frequency is 301 Hz and the sine wave frequency is 50 Hz, then the sixth harmonic of the sine wave frequency (i.e. 300 Hz) will interfere with the triangle wave frequency of 301 Hz resulting in a beat component of 1 Hz. Although this problem is minimized with proper synchronism between the triangle waveform and sine wave signal, this patent points out that it is extremely difficult to obtain such synchronism. The problem of synchronizing the triangle waveform and sine wave signal is avoided by setting the triangle wave frequency at six times the sine wave frequency (i.e. providing a chopping ratio of six), thereby limiting the operation of the motor to a relatively low range of speeds.

One disadvantage of the aforenoted motor-drive circuit is that motor speed control is constrained to a relatively low range of speeds. As the sine wave frequency increases, the triangle wave frequency (which is not synchronized with the sine wave frequency) likewise must be increased, while maintaining the chopping ratio of six. Consequently, the frequency of the PWM pulses soon will reach the limit at which the SCR's in the inverter can be switched.

In accordance with one advantageous feature of the present invention, to be described in detail, the triangle waveform is synthesized from the sine wave signal such that the triangle wave frequency automatically is in precise synchronism with the sine wave frequency. The triangle waveform naturally includes a gradually increasing (or positively sloped) edge and a gradually decreasing (or negatively sloped) edge. These edges are substantially linear such that proper PWM pulses are generated in accordance with the intersection of the triangle waveform and the sine wave signal.

Another advantageous feature of the present invention is the ability to control motor speed over a relatively wide range. To avoid deleterious influences attributed to higher order harmonics, the chopping ratio is changed over when the sine wave frequency reaches different discrete values. For example, at relatively lower motor speeds, the chopping ratio is selected to be equal to 9. The motor speed is increased as the sine wave frequency increases, and when this sine wave frequency reaches, for example, 38 Hz, the chopping ratio is reduced to six. As the motor is further increased by increasing the sine wave frequency, the chopping ratio is changed over to three at a sine wave frequency of, for example 50 Hz. The higher order triangle wave frequencies are produced by a novel amplitude folding technique in accordance with one aspect of the present invention. That is, by operating on the fundamental triangle waveform, the higher order triangle waveforms are generated, these higher order waveforms being exactly synchronized with the sine wave signal and also with the fundamental triangle waveform. A desirable feature of this amplitude folding technique is that the zero crossings of the higher order triangle waveforms coincide with the zero crossing of the fundamental triangle waveform. Consequently, transition disturbances are not introduced when changing over from higher order to lower order (or vice versa) triangle waveforms to produce the PWM pulses.

A sawtooth waveform generator wherein the sawtooth signal is synthesized from four phases of a sine wave signal is described in U.S. Pat. No. 2,580,673. In this generator, two of the four sine wave phases are shifted in amplitude, and then a segment of each phase, taken at 45° on either side of the zero axis of that phase, is selected. This results in a non-linear sloping side and an abrupt return to a base or reference level at the end of each sawtooth so as to commence the next following sawtooth. The resultant sawtooth waveform is totally undesirable for use in a PWM generator. This is because the sawtooth waveform includes only gradually rising (or gradually falling) edges. Each sawtooth wave begins and ends on a vertical edge. If these vertical edges are used to generate PWM pulses to drive a three-phase motor, the line voltage across the motor at each vertical edge will have no effect. That is, one-half of all commutations would be wasted. As a consequence thereof, the harmonic content in the drive pulses supplied to the motor would seriously degrade the operation thereof.

OBJECTS OF THE INVENTION

Therefore, it is an object of the present invention to provide an improved method and apparatus for generating waveforms which overcome the aforenoted disadvantages of the prior art, which waveforms are particularly adapted for use in a motor-drive circuit.

Another object of this invention is to provide an improved method and apparatus for synthesizing a triangle waveform from an n-phase sine wave signal.

A further object of this invention is to provide a low-cost, highly accurate method and apparatus for generating waveform signals which are particularly useful in driving a PWM-type inverter to energize an AC motor.

An additional object of this invention is to provide a method and apparatus for implementing the so-called triangle intercept technique for generating a PWM signal that is particularly adapted to drive an inverter, wherein a triangle waveform is synthesized from a reference sine wave signal so as to be in precise synchronism therewith regardless of changes in the frequency of the reference signal.

Yet another object of this invention is to provide a triangle waveform generator for synthesizing a triangle waveform from a reference sine wave signal and for multiplying the frequency of that triangle waveform by use of an amplitude folding technique, whereby the fundamental and higher order frequencies of the triangle waveforms are in precise synchronism with the sine wave signal and exhibit common zero crossing points.

A still further object of this invention is to provide a method and apparatus for generating waveform signals which are used in driving an n-phase motor in response to a reference signal whose frequency and amplitude are controllable, whereby the motor is controllably driven over a relatively wide range of speeds.

Another object of this invention is to provide a method and apparatus for driving a PWM-type inverter in accordance with the so-called triangle intercept technique in which a reference oscillating signal of controllable frequency is compared to a selected one of a plurality of triangle waveforms of different frequencies to generate PWM pulses, and wherein the highest triangle wave frequency is selected to ensure the highest operating frequency of the PWM pulses.

Yet another object of this invention is to provide a method and apparatus for generating waveforms to drive a PWM-type inverter in accordance with the triangle intercept technique, wherein the problem of beat frequencies due to subharmonics is avoided.

Various other objects, advantages and features of the present invention will become readily apparent from the ensuing detailed description, and the novel features will be particularly pointed out in the appended claims.

SUMMARY OF THE INVENTION

In accordance with one aspect of this invention, a triangle waveform is generated from an n-phase sine wave signal, the frequency of the triangle waveform being a multiple (n) of the sine wave frequency, the triangle waveform being generated by detecting when a segment of any of the n phases of the sine wave signal is within a predetermined angular amount from a reference crossing level, such as the zero crossing level, and selecting successive ones of the detected segments so as to synthesize the triangle waveform therefrom. The triangle waveform can be used in conjunction with the sine wave signal to produce pulse width modulated (PWM) pulses in accordance with the so-called triangle intercept technique. That is, the triangle waveform is compared with the sine wave signal to produce a PWM pulse transition at each interception point.

In accordance with another aspect of this invention, the frequency of the synthesized triangle waveform is increased by an amplitude folding technique. This technique contemplates a pair of equal but opposite folding levels about which the synthesized triangle waveform is folded whenever that waveform reaches such levels.

Yet another aspect of this invention is to provide, concurrently, the fundamental and higher frequencies of the triangle waveform, the latter produced by the amplitude folding technique, and a switching circuit to switch a selected one of these triangle waveforms to be compared with the sine wave signal, the switching being carried out as a function of the sine wave frequency. This arrangement is particularly useful in driving a PWM-type inverter employed to energize an n-phase motor, such that the motor is driven at optimum efficiency over a relatively broad range of motor speeds.

BRIEF DESCRIPTION OF THE DRAWINGS

The following detailed description, given by way of example, will best be understood in conjunction with the accompanying drawings in which:

FIG. 1 is a schematic representation of a basic 3-phase PWM-type inverter;

FIGS. 2A and 2B are waveform diagrams which are useful in understanding the operation of a PWM pulse generator using the triangle wave intercept technique;

FIG. 3 is a waveform diagram which is useful in understanding the manner in which the triangle waveform is synthesized from a three-phase sine wave signal in accordance with the present invention;

FIGS. 12A-12E are waveform diagrams which are useful in understanding the operation of the circuit shown in FIG. 11.

DETAILED DESCRIPTION OF CERTAIN PREFERRED EMBODIMENTS

Figure 4:
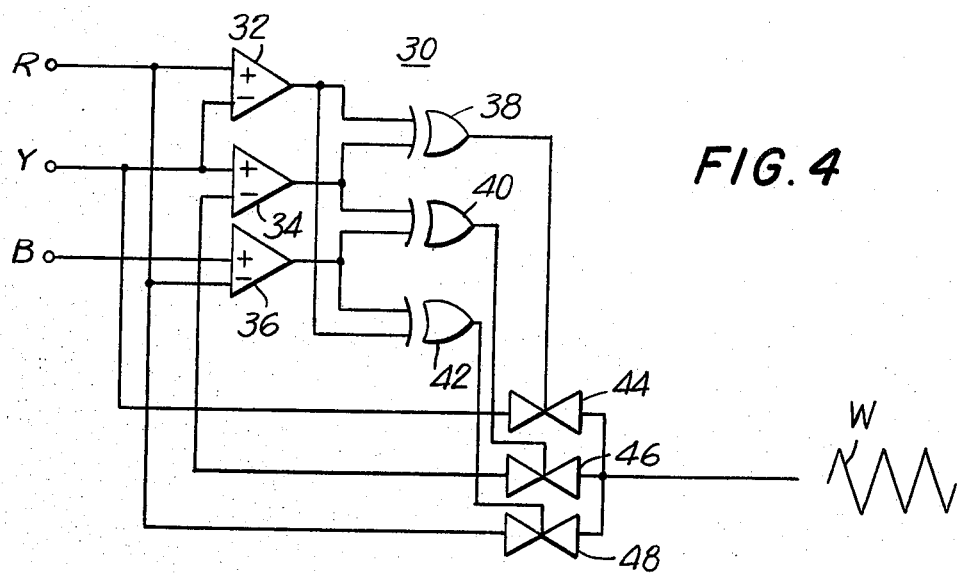
FIG. 4 is a schematic representation of one embodiment of the triangle waveform synthesizer in accordance with the present invention.

Referring now to the drawings, and in particular FIG. 1, there is illustrated a schematic representation of a simplified embodiment of a 3-phase PWM-type inverter 10 which can be used to drive a three-phase motor 20. This inverter may be conventional and is constructed of thyristor devices, such as silicon-controlled rectifiers (SCR's) $S_1$-$S_6$. As is known, each SCR is adapted to be rendered conductive (that is, turned ON) in response to a turn-ON pulse and to remain conductive for at least the duration of that pulse. When conductive, a direct current can flow therethrough in a direction determined by the polarity of the SCR.

Motor 20 is provided with three phases, designated R, Y and B for the purpose of the present description. These three phases may be connected in a star or delta within the motor. Currents flowing selectively into the R, Y and B phase terminals cause the motor to produce a useful torque. For proper operation thereof, a sequence of positive and negative currents flows through each phase.

SCR's $S_1$ and $S_4$ are poled in the same direction and are connected in series. The junction defined by the cathode of SCR $S_1$ and the anode of SCR $S_4$ is connected to the R-phase of motor 20. Similarly, SCR's $S_3$ and $S_6$ are poled in the same direction and are connected in series. The junction defined by the cathode of SCR $S_3$ and the anode of SCR $S_6$ is connected to the Y-phase of the motor. Finally, SCR's $S_5$ and $S_2$ are poled in the same direction and are connected in series. The junction defined by the cathode of SCR $S_5$ and the anode of SCR $S_2$ is connected to the B-phase of motor 20. It is appreciated that, depending upon which SCR $S_1$-$S_6$ is turned on, a corresponding current flows through the respective motor phase. For example, if SCR $S_1$ is turned ON, positive current flows through the R-phase, and when this SCR is turned OFF and SCR $S_4$ is turned ON, a negative current flows through the R-phase. Similar commutation is attained from SCR's $S_2$, $S_3$, $S_5$ and $S_6$.

The series-connection of SCR's $S_1$ and $S_4$ is connected in parallel with the series-connection of SCR's $S_3$ and $S_6$ and also in parallel with the series-connection of SCR's $S_5$ and $S_2$.

A DC power supply, represented by DC source 12, is connected across these parallel-connected circuits. Diodes $D_1$-$D_6$ are connected in parallel with SCR's $S_1$-$S_6$, respectively, and are oppositely poled with respective to these SCR's so as to take into account reactive currents.

SCR's $S_1$-$S_6$ each includes a gate terminal to which is provided the turn-ON and gate pulses. These pulses are derived from the pulse width modulated pulses which, desirably, are generated by utilizing the teachings of the present invention. A preferred embodiment of the inverter circuit shown in FIG. 1 is the so-called McMurray circuit which is described in U.S. Pat. No. 3,207,974. A further description of a more detailed construction of inverter 10 that is driven by PWM pulses is described in aforementioned U.S. Pat. No. 4,047,083.

The inverter represented by the simplified embodiment shown in FIG. 1 supplies sequences of positive-going and negative-going current pulses to motor 20. As is known, a pulse signal is accompanied by various harmonics, the presence of many being undesirable in motor-drive applications. For example, such unwanted harmonics may result in torque and speed disturbances. Such unwanted harmonics also may produce motor heating due to an increase in the iron and copper losses. Still further, harmonics may be the cause of current transients which are so large as to be beyond the switching capability of the typical inverter.

Another constraint in inverter circuits which use SCR devices is that such circuits exhibit a relatively low cycling rate. For example, although a given inverter phase may change its state in a matter of microseconds, that is, the SCRs may be switched from their conducting to their non-conductive states rapidly, and vice versa but they cannot then return to their initial states until the transient commutation currents have settled. Typically when used in an inverter, the cycling time of each SCR is on the order of 150-450 microseconds. For example, with reference to FIG. 1, let it be assumed that SCR $S_1$ is conducting and SCR $S_4$ is non-conducting. Now, SCR $S_1$ may be turned OFF and, concurrently, SCR $S_4$ may be turned ON in only a few microseconds. However, once the conducting states of these SCR's have been changed, they cannot be returned to their initial states (that is, SCR $S_1$ cannot be turned ON and SCR $S_4$ cannot be turned OFF) for about 300 microseconds. This means that the PWM pulses which are supplied to the gate terminals of the respective SCR's must have a duration that is greater than 300 microseconds. A PWM pulse whose duration is less than this value is not effective in switching the conducting states of the SCR's. Such a short duration pulse must be blocked out.

The PWM pulses which are used to control the conducting states of the SCR's in the inverter shown in FIG. 1 are generated by comparing a triangle waveform with a variable control signal. For example, if the triangle waveform is shown as waveform W in FIG. 2A, and if the variable control signal is shown as signal C, then each intersection of triangle waveform W with control signal C is used to produce a pulse transition, such as shown in FIG. 2B. The pulses shown in FIG. 2B are pulse width modulated as a function of the amplitude of control signal C. These PWM pulses are negative-going; and it is appreciated that, if control signal C is a negative signal, then the PWM pulses are positive-going. The duration T of each PWM pulses P should be greater than about 300 microseconds.

The PWM pulses shown in FIG. 2B are supplied to the SCR's which are associated with only a single phase of motor 20. For example, the PWM pulses are used to trigger SCR's $S_1$ and $S_4$ which energize the R-phase of the motor. Another set of PWM pulses (which may be phase displaced from those shown in FIG. 2B) are used to trigger SCR's $S_3$ and $S_6$ to energize the Y-phase. Likewise, another set of PWM pulses is used to trigger SCR's $S_5$ and $S_2$ to energize the B-phase. If it is assumed that the pulses shown in FIG. 2B are used to trigger SCR's $S_1$ and $S_4$, then a negative transition switches SCR's $S_1$ and $S_4$ from a first to a second conducting condition and a positive pulse transition switches the SCR's from their second to their first conducting condition. For example, the negative transition in PWM pulses P will turn ON SCR $S_1$ and will turn OFF SCR $S_4$. Conversely, the positive transition PWM pulses P will turn OFF SCR $S_1$ and will turn ON SCR $S_4$. The rate at which these SCR's are turned ON and OFF is determined by the number of intersections between triangle waveform W and control signal C. If the triangle wave frequency increases, the cycling of the SCR is also increased. If the control signal C is an oscillating signal, then the cycling of the SCR's will increase if the frequency of this control signal increases. The duration of each PWM pulse is determined by the amplitude of control signal C. It is seen, from FIGS. 2A and 2B, that the relationship between triangle waveform W and control signal C must be such that the maximum amplitude of the control signal does not result in a pulse duration T of less than the switching limitation of the SCR's (described above as being on the order of 300 microseconds).

Although the minimum duration T of the PWM pulses P should be on the order of 300 microseconds, it is preferable to limit the number of switching cycles of the SCR's to a satisfactorily low level. In practice, the frequency of triangle waveform W is less than about 400 Hz. At this low triangle wave frequency, undesirable subharmonic components may be generated when the triangle intercept technique is employed. In the triangle intercept technique, control signal C is a sine wave signal whose frequency and amplitude both are controllable so as to determine the operating speed and torque, respectively, of the motor. As pointed out in U.S. Pat. No. 4,047,083, it is theoretically desirably for the triangle waveform and sine wave signal to be synchronized. In accordance with waveform generating apparatus which have been proposed heretofore, however, it is possible that the sine wave frequency may be equal to the 50 Hz and the triangle wave frequency may be equal to 301 Hz. This small variance of precise synchronism between the triangle wave and sine wave frequencies results in a beat signal interference of 1 Hz (due to the sixth harmonic of the sine wave signal and the fundamental of the triangle waveform). This 1 Hz subharmonic component results in a subharmonic current flow in the motor windings. Since the impedance of the motor windings at this very low frequency is low, the magnitude of the subharmonic current will be high enough to seriously degrade the performance of that motor.

The problem of a subharmonic component also may be introduced in the event that the control signal C has an amplitude which is so high that the duration T of the pulse produced by the intersection of the triangle waveform W and this control signal is less than the 300 microseconds minimum duration. Such relatively narrow pulses will be locked out, such that the lock-out effect varies at a low subharmonic rate.

As mentioned above, it is desirable to maintain the cycling rate of the SCR's included in the inverter at approximately 400 Hz. For the triangle intercept technique wherein the motor speed is a function of the frequency of the sine wave control signal, this is not easily attained. For example, at low operating speeds wherein the sine wave frequency is, for example, about 25 Hz, the chopping ratio, that is, the ratio between the triangle wave and sine wave frequencies, should be higher than the chopping ratio for greater motor speeds, such as speeds wherein the sine wave control signal has a frequency of about 100 Hz. For a sine wave frequency of 25 Hz, the chopping ratio may be equal to nine, which requires a triangle wave frequency of 225 Hz. This results in an SCR switching rate of 225 cycles. If the chopping ratio is maintained at nine, then as the sine wave frequency increases, the triangle wave frequency also increases, thereby increasing the SCR switching rate such that it soon will exceed 400 Hz. Consequently, in a practical system, the chopping ratio should be reduced at discrete sine wave frequencies so as to ensure that the SCR switching rate will not be excessive.

As mentioned hereinabove, all of the foregoing problems have not been solved satisfactorily by prior art proposals.

In accordance with one aspect of the present invention, the difficulty attending subharmonic currents due to mis-synchronization between the triangle waveform and sine wave signal in the triangle intercept method of PWM generation is avoided. This is attained by synthesizing the triangle waveform from the sine wave control signal. As shown in FIG. 3, for an n-phase sine wave signal, wherein n=3, segments of phases R, Y and B are assembled sequentially to produce a triangle waveform of frequency nf, wherein f is the fundamental frequency of the sine wave signal. More particularly, when the amplitude of any of phases R, Y and B is within a predetermined angular amount from its zero crossing, the amplitude of that phase is used as either the increasing or decreasing edge of the triangle waveform. For a three-phase sine wave signal, this predetermined angular amount is 30°. Thus, and as shown in FIG. 3, segments $Y_1$ and $Y_2$ on the rising portion of the Y-phase are within 30° of the zero-crossing of this Y-phase. Segments $R_1$ and $R_2$ on the falling portion of the R-phase are within 30° on either side of the zero crossing of this R-phase. Segments $B_1$ and $B_2$ on the rising portion of the B-phase are within 30° on either side of the zero crossing of this B-phase. Segments $Y_3$ and $Y_4$ on the falling portion of the Y-phase are within 30° on either side of the zero crossing of this Y-phase. Segments $R_3$ and $R_4$ on the rising portion of the R-phase are within 30° of the zero crossing of this R-phase. Finally, segments $B_3$ and $B_4$ on the falling portion of the B-phase are within 30° of the zero crossing of this B-phase. The present invention proceeds by detecting segments $Y_1$ and $Y_2$, followed by segments $R_1$ and $R_2$, followed by segments $B_1$ and $B_2$, followed by segments $Y_3$ and $Y_4$, and so on. These detected segments are assembled sequentially to produce the triangle waveform which is represented by the cross-hatched areas in FIG. 3. It is appreciated that this triangle waveform is formed with a positively sloped, gradually increasing portion constituted by segments $Y_1$ and $Y_2$, followed by a negatively sloped, gradually decreasing portion constituted by segments $R_1$ and $R_2$. The next cycle of this triangle waveform is formed of the positively sloped portion constituted by segments $B_1$ and $B_2$ followed by the negatively sloped portion constituted by segments $Y_3$ and $Y_4$. The next cycle in this triangle waveform is formed of the positively sloped portion consitituted by segments $R_3$ and $R_4$ followed by the negatively sloped portion constituted by segments $B_3$ and $B_4$. Three cycles of the triangle waveform thus are synthesized during one complete cycle of, for example, the Y-phase of the sine wave signal. Therefore, for a three-phase sine wave signal of frequency f, the triangle waveform synthesized therefrom has a frequency of 3f. It will be appreciated that, as a general mathematic relation, if an n-phase sine wave signal is used, the frequency of the triangle waveform synthesized therefrom is equal to nf.

If the negative peak level of the R, Y and B phases shown in FIG. 3 is assumed to be a reference level, then the particular segments of each phase which are used to synthesize the triangle waveform are selected as follows:

(a) That segment of the Y-phase is selected when the amplitude of the Y-phase is greater than that of the B-phase and also less than that of the R-phase; or, alternatively, if the amplitude of the Y-phase is less than that of the B-phase but greater than that of the R-phase. This results in segments $Y_1$, $Y_2$ and also in segments $Y_3$ and $Y_4$.

(b) The R-phase is selected wherein the amplitude of the R-phase is greater than that of the B-phase and also less than that of the Y-phase; or, alternatively, the amplitude of the R-phase is greater than that of the Y-phase but less than that of the B-phase. This results in segments $R_1$, $R_2$ and also in segments $R_3$, $R_4$.

(c) The B-phase is selected wherein the amplitude of this phase is greater than that of the R-phase and also less than that of the Y-phase; or, alternatively, the amplitude of the B-phase is greater than that of the Y-phase and also less than that of the R-phase. This results in segments $B_1$, $B_2$ and also in segments $B_3$, $B_4$.

The foregoing relationship may be expressed by the following Boolean expressions:

| Y if | $((R > Y)$ | . | $(Y > B))$ | + | $((R < Y)$ | . | $(Y < B))$ |
| B if | $((Y > B)$ | . | $(B > R))$ | + | $((Y < B)$ | . | $(B < R))$ |
| R if | $((B > R)$ | . | $(R > Y))$ | + | $((B < R)$ | . | $(R < Y))$ |

The foregoing Boolean expression may be implemented, in accordance with one embodiment of the present invention, by a triangle waveform generator 30 illustrated in FIG. 4. This triangle waveform generator is comprised of comparators 32, 34 and 36, exclusive-OR gates 38, 40 and 42 and analog transmission gates 44, 46 and 48. Each of the comparators may include a differential amplifier having non-inverting (+) and inverting (−) inputs, respectively. Depending upon which of the inputs is supplied with a signal of greater amplitude, the comparator is adapted to produce a binary "1" or "0". That is, if the amplitude supplied to the non-inverting (+) input is greater than the amplitude supplied to the inverting (−) input, the comparator produces a binary "1". Conversely, if the amplitude of the signal supplied to the inverting (−) input is greater than the amplitude of the signal supplied to the non-inverting (+) input, the comparator produces a binary "0". As shown in FIG. 4, the R-phase of the three-phase sine wave signal is supplied to the non-inverting input of comparator 32 and to the inverting input of comparator 36. The Y-phase is supplied to the non-inverting input of comparator 34 and to the inverting input of comparator 32. The B-phase is supplied to the non-inverting input of comparator 36 and to the inverting input of comparator 34.

Exclusive-OR gates 38, 40 and 42 are conventional logic elements in that each exclusive-OR gate produces a binary "1" only when the binary signals supplied to the respective inputs thereof differ from each other. If the supplied binary signals both are a binary "1" or a "0", the exclusive-OR gate produces a binary 37 0". Exclusive-OR gate 38 has one input thereof connected to the output of comparator 32 and its other input connected to the output of comparator 34. Exclusive-OR gate 40 has one input thereof connected to the output of comparator 34 and the other input thereof connected to the output of comparator 36. Finally, exclusive-OR gate 42 has its inputs connected to the outputs of comparators 32 and 36, respectively.

Analog transmission gates 44, 46 and 48 are conventional devices having analog and control inputs, respectively. The analog transmission gate is adapted to pass, or transmit, the analog signal supplied to its analog input provided a predetermined control signal is supplied to its control input. For the purpose of the present discussion, each analog transmission gate is adapted to transmit the analog signal supplied thereto provided a binary "0" is received at its control input. Analog transmission gate 44 has its analog input connected to receive the Y-phase of the sine wave signal and its control input connected to the output of exclusive-OR gate 38. Analog transmission gate 46 has its analog input connected to receive the B-phase, and its control input is connected to the output of exclusive-OR gate 40. Finally, analog transmission gate 48 has its analog input connected to receive the R-phase, and its control input is connected to the output of exclusive-OR gate 42.

In operation, if the amplitude of the R-phase is greater than that of the Y-phase, comparator 32 supplies a binary "1" to exclusive-OR gates 38 and 42. If, concurrently, the amplitude of Y-phase is greater than that of the B-phase, comparator 34 also supplies a binary "1" to exclusive-OR gate 38. At this time, exclusive-OR gate 38 is provided with a binary "1" at each of its inputs, resulting in a binary "0" supplied as the control input to analog transmission gate 44, whereupon the analog transmission gate transmits, or passes, a segment of the Y-phase. As shown in FIG. 3, this segment is equal to segments $Y_1$ and $Y_2$.

From FIG. 3, it is appreciated that the amplitude of the Y-phase soon exceeds that of the R-phase, resulting in a binary "0" at the output of comparator 32. This results in a binary "1" at the output of exclusive-OR gate 38, thereby closing analog transmission gate 44. At this time, however, the amplitude of the R-phase is greater than that of the B-phase, resulting in a binary "0" at the output of comparator 36. Since comparators 32 and 36 both produce a binary "0", exlusive-OR gate 42 (being provided with equal binary signals at its inputs) supplies a binary "0" to analog transmission gate 48. This, in turn, opens analog transmission gate 48 to transmit, or pass, a segment of the R-phase. As shown in FIG. 3, this transmitted segment is constituted by segments $R_1$ and $R_2$.

As the amplitude of the R-phase decreases, that of the B-phase increases. When the B-phase exceeds the R-phase, comparator 36 produces a binary "1" which is supplied to exclusive-OR gate 42, resulting in the closing of analog transmission gate 48. Hence, the R-phase no longer is transmitted. At this time, the amplitude of the Y-phase is greater than that of the B-phase, resulting in a binary "1" at the output of comparator 34. Since comparators 34 and 36 both produce a binary "1", exclusive-OR gate 40 responds thereto to supply a binary "0" to analog transmission 46. Consequently, this analog transmission gate is opened to transmit, or pass, a segment of the B-phase. This transmitted segment is represented as segments $B_1$ and $B_2$ in FIG. 3.

The foregoing operation is repeated as the R, Y and B phases vary in their respective amplitudes. It is seen that analog transmission gates 44, 46 and 48 are selectively and sequentially energized so as to pass the appropriate segments of the sine wave signals, which segments, when assembled in sequence at the outputs of these analog transmission gates, appear as the triangle waveform W. The frequency of this triangle waveform is three times $(3\times)$ the fundamental frequency of the sine wave signal, thus resulting in a chopping ratio of three. This fundamental triangle waveform W sometimes is referred to herein as the "3-chop waveform."

It is appreciated that the triangle waveform is synthesized directly from the respective phases of the sine wave signal. This, as the frequency of the sine wave signal increases, the frequency of the triangle waveform likewise increases and, conversely, a decrease in the sine wave frequency results in a corresponding decrease in the triangle wave frequency. Consequently, an exact chopping ratio is maintained; and the triangle waveform is in precise synchronism with the sine wave signal. Because of this precise synchronism, the aforenoted problem of subharmonic degradation is avoided.

Figure 5:
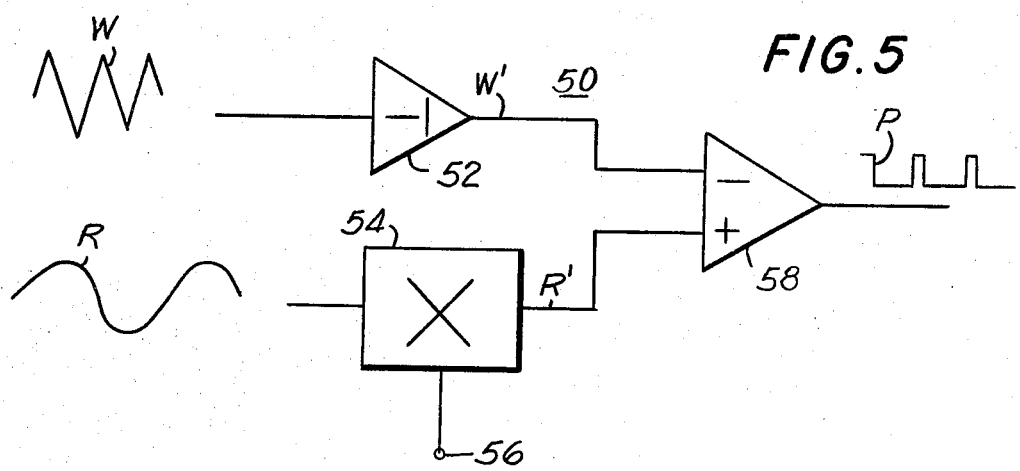
FIG. 5 is a block diagram of a comparator circuit that is used to carry out the triangle intercept technique for generating PWM pulses.

The triangle waveform W produced by the triangle waveform synthesizer shown in FIG. 4, is used in accordance with the triangle intercept technique to produce PWM pulses. One embodiment of a PWM pulse generator 50 which is used to carry out this triangle intercept method is illustrated in FIG. 5 as comprising an inverter 52, a controllable attenuator 54 and a comparator 58. Inverter 52 is adapted to invert the polarity of triangle waveform W and, for example, may comprise an inverting amplifier having a gain of $-1$. Variable attenuator 54 is adapted to be supplied with a respective phase of the n-phase sine wave signal and to attenuate the amplitude of that phase by a controllable amount. For the purpose of the present discussion, it is assumed that the R-phase of the three-phase sine wave signal is supplied to controllable attenuator 54. A control input 56 is adapted to receive a control signal which determines the attenuating ratio of this controllable attenuator. Such controllable attenuators are known to those of ordinary skill in the art, and in the interest of brevity, further description thereof is not provided.

Comparator 58 may be similar to any of the aforementioned comparators 32, 34 and 36 and includes an inverting ($-$) input connected to inverter 52 and a non-inverting ($+$) input connected to the output of controllable attenuator 54. Comparator 58 is adapted to produce a negative transition when the inverted version W' of triangle waveform W crosses over the attenuated version R' of the sine wave signal in the positive direction (i. e. $W' > R'$), and produces a positive transition when the inverted triangle waveform W' crosses the attenuated sine wave signal R' in the negative direction ($W' < R'$).

It is appreciated that, in order to avoid the aforenoted pulse lock-out problem, that is, to avoid the problem of generating a PWM pulse whose duration T is less than a predetermined minimum width (e. g. 300 microseconds), it is necessary that the sine wave signal R be attenuated such that its peak level is less than the peak level of the triangle waveform W. The minimum duration of the generated PWM pulses is determined by the ratio of the triangle waveform peak to the sine wave peak.

The purpose of inverting the polarity of the triangle waveform W is to produce negative-going pulses during the positive half-cycle of the sine wave signal and to produce positive-going pulses during the negative half-cycle. This results in a duty cycle of greater than 50% during the positive half-cycle and a duty cycle of less than 50% during the negative half-cycle.

Figure 6A:
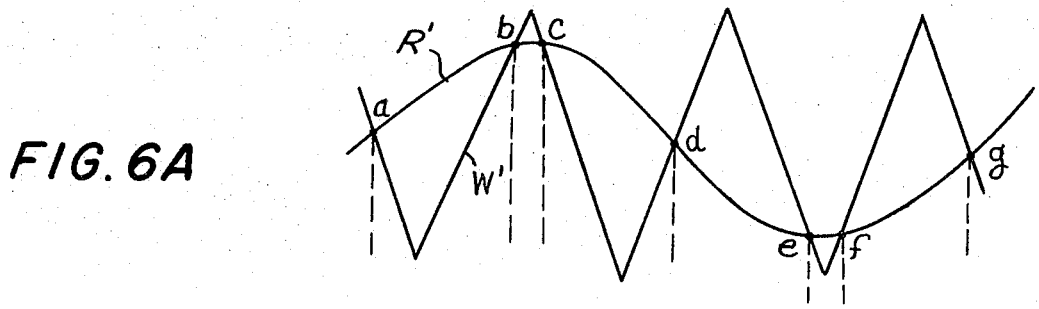
FIGS. 6A and 6B are waveform diagrams which are useful in understanding the operation of the circuit represented in FIG. 5.
Figure 6B:
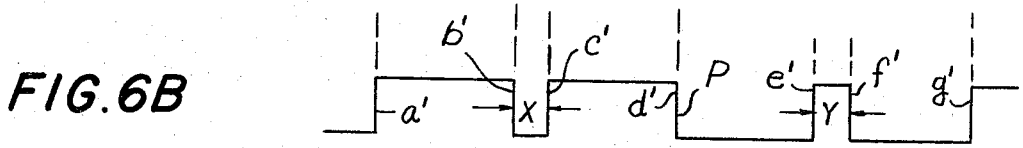

The manner in which the PWM pulses are produced by PWM generator 50 is illustrated in FIGS. 6A and 6B. As shown in FIG. 6A, inverted triangle waveform W' intersects the attenuated R-phase sine wave signal R' at intersecting points a, b, c, d, e, f and g. Comparator 58 produces a transition at each of these intersecting points. A positive transition a' is produced at intersecting point a because, at this intersection, inverted triangle waveform W' crosses the attenuated sine wave signal R' in the negative direction. A negative transition b' is produced at insecting point b because the inverted triangle waveform W' crosses the attenuated sine wave signal R' in the positive direction. It is seen that the remaining transitions c', d', f' and g' are produced at intersecting points c, d, e, f and g, respectively. It also is seen that, during the positive half-cycle of the attenuated sine wave signal R', the duty cycle of PWM pulses P is greater than 50%, thus representing this positive half-cycle; and the duty cycle of the PWM pulses during the negative half-cycle of the attenuated sine wave signal R' is less than 50%.

As the amplitude of attenuated sine wave signal R' changes, the pulse durations X and Y change in an inverse manner. That is, if the amplitude of the attenuated sine wave increases, these pulse durations decrease. From FIG. 5, it is seen that the amplitude of the attenuated sine wave signal R' is a function either of the amplitude of the input phase R or a function of the attenuating control signal which is supplied to control input 56. When the amplitude of the attenuated sine wave signal R' is reduced to zero, the PWM pulses P exhibit a square wave signal of 50% duty cycle and of a frequency equal to that of the triangle wave form W.

It should be appreciated that PWM generator 50, shown in FIG. 5, is associated only with the respective phase of the inverter which it drives. The remaining phases are driven by similar PWM generators, each additional PWM generator being supplied with the same triangle waveform W but with a respective phase of the three-phase sine wave signal. That is, in the embodiment of FIG. 5, the PWM generator is supplied with the R-phase. To drive a three-phase PWM-type inverter, two additional PWM generators are provided, these additional PWM generators being supplied with the Y-phase and the B-phase signals, respectively. Since all three phases R, Y and B of the sine wave signal are compared to a common triangle waveform W, it is appreciated that, at zero control signal level, that is, when the R, Y and B phases all are zero, all three PWM signals produced by the corresponding PWM generators produce substantially identical, in-phase pulses. Thus, all three phases of the PWM-type inverter are switched in unison to produce an effective zero output voltage.

Figure 7:
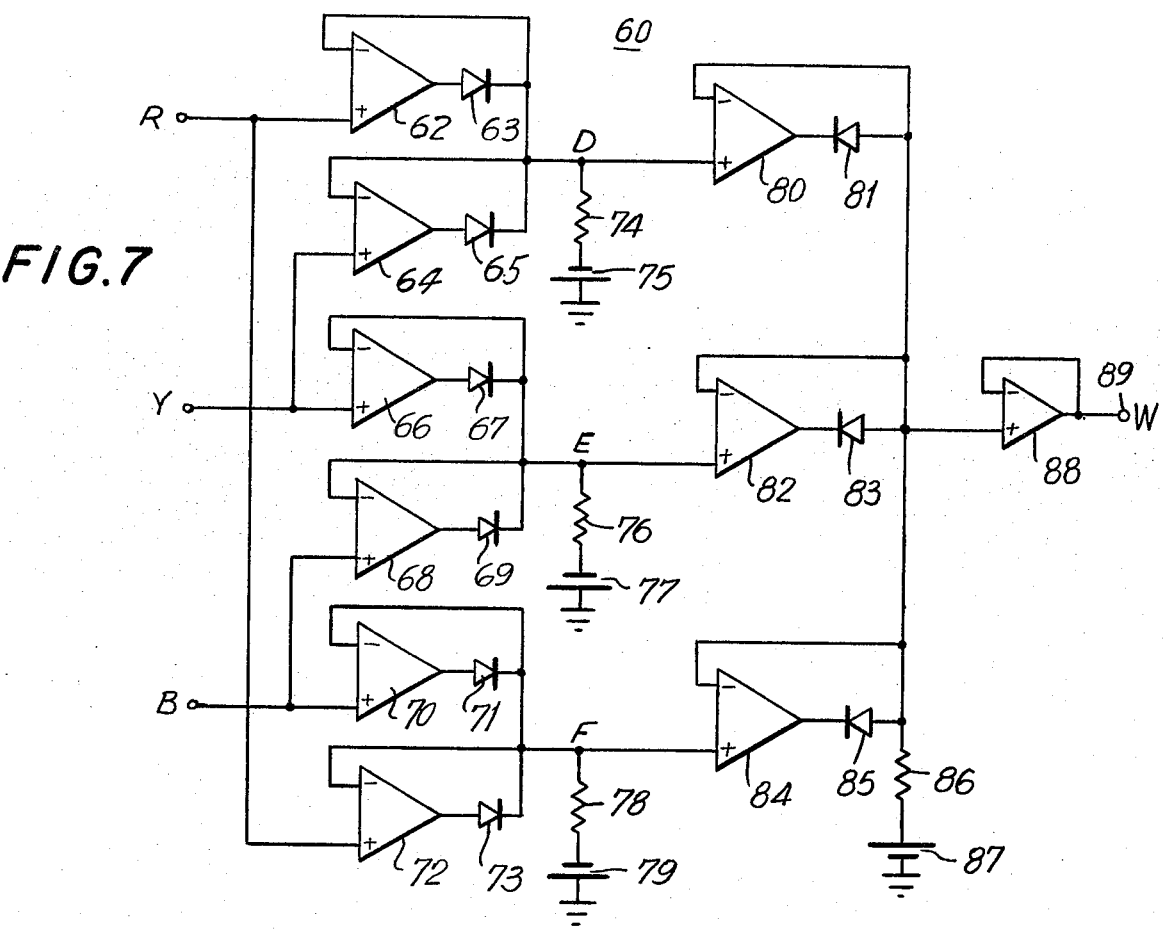
FIG. 7 is a schematic representation of another embodiment of a triangle wave synthesizer in accordance with the present invention.

Another embodiment of a triangle waveform generator which can be used to carry out the synthesizing technique of the present invention is illustrated in FIG. 7. This triangle waveform synthesizer 60 is comprised of a plurality of operational amplifiers 62, 64, 66, 68, 70 and 72 having non inverting (+) and inverting (−) inputs, and with an output connected in feedback relation to the inverting input via a respective diode 63, 65,67,69,71 and 73 respectively. The R-phase sine wave signal is supplied to the non-inverting (+) inputs of operational amplifiers 62 and 72, respectively. The Y-phase sine wave signal is supplied to the non-inverting (+) inputs of operational amplifiers 64 and 66, respectively. The B-phase sine wave signal is supplied to the non-inverting (+) inputs of operational amplifiers 68 and 70, respectively. Operational amplifiers 62 and 64 are connected, via diodes 63 and 65, respectively, to a common junction. This common junction is connected to a reference potential, such as ground, via a resistor 74 and a negative bias voltage, represented by a bias voltage source 75. The purpose of diodes 63 and 65 is to supply, to this common junction, only the greater of the R and Y phases.

The outputs of operational amplifiers 66 and 68 are connected to a common junction via diodes 67 and 69, respectively. This common junction is connected to ground by a resistor 76 and a bias potential, represented as bias source 77. Diodes 67 and 69 are poled so as to supply the greater of the Y and B phases across resistor 76.

In similar manner, the outputs of operational amplifiers 70 and 72 are connected to a common junction via diodes 71 and 73. A resistor 78 connects this common junction to ground; and a bias voltage, represented by bias source 79, applies a predetermined bias potential to this junction. Diodes 71 and 73 are poled so as to supply the greater of the R and B phases across resistor 78.

The voltages provided across resistors 74, 76 and 78 are compared by amplifiers 80, 82 and 84 to select the smallest of these three voltages. Each of amplifiers 80, 82 and 84 may be similar to the aforementioned amplifiers.

Each of these amplifiers is, therefore, comprised of an operational amplifier having non-inverting (+) and inverting (−) inputs. More particularly, the non-inverting (+) input of operational amplifier 80 is connected to receive the voltage across resistor 74, and its output is connected in feedback relation via negatively poled diode 81 to its inverting (−) input. Amplifiers 82 and 84 are connected in a similar manner; and the outputs of diodes 81, 83 and 85, that is, the anodes thereof, are connected in common to ground via a resistor 86 that is supplied with a positive bias potential represented by bias source 87. It may be appreciated that the voltage across resistor 86 is equal to the voltage of least amplitude as supplied to amplifiers 80, 82 and 84. This voltage across resistor 86 is connected to an output terminal via a buffer 88 to provide triangle waveform W. Buffer 88 may be, for example, a unity gain non-inverting operational amplifier.

Figure 8A:
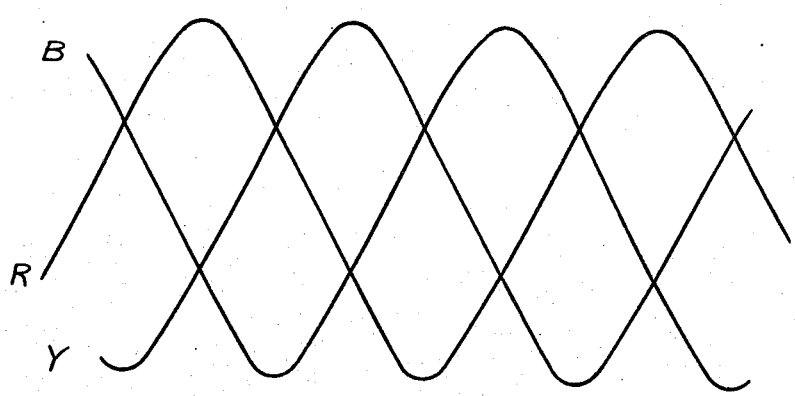
FIGS. 8A-8E are waveform diagrams which are useful in understanding the operation of the embodiment shown in FIG. 7.
Figure 8B:
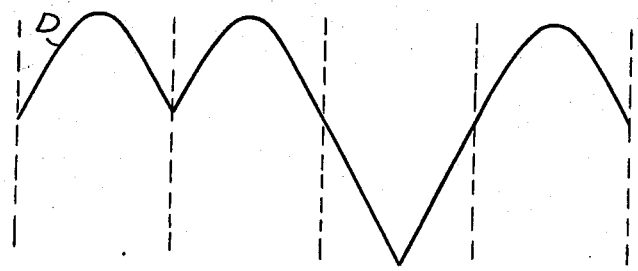

The manner in which triangle waveform synthesizer 60 operates now will be described with reference to FIGS. 8A–8E. For convenience, the R, Y and B phases of the sine wave signal are drawn in FIG. 8A. Amplifiers 62 and 64, together with diodes 63 and 65, produce a signal D whose amplitude is equal to the lower of the R and Y phase amplitudes. This signal D, provided across resistor 74, is illustrated in FIG. 8B. It is seen that, initially, the R-phase exhibits a greater amplitude than the Y-phase. At the first intersection of these phases, the Y-phase then exceeds the R-phase, until the next-following intersection, whereupon the R-phase once again exceeds the Y-phase. This relationship clearly is illustrated in FIG. 8B.

Similarly, amplifiers 66 and 68, together with diodes 67 and 69, produce the signal E, which signal exhibits an amplitude that is substantially equal to the greater of the Y and B phase amplitudes. This signal E, produced across resistor 76, initially corresponds to the B-phase amplitude until this phase intersects the Y-phase amplitude. From that intersection until the next-following intersection of these phases, signal E is substantially equal to the Y-phase amplitude. This is shown clearly in FIG. 8C.

Likewise, amplifiers 70 and 72, together with diodes 71 and 73, produce signal F across resistor 78. This signal F initially is substantially equal to the R-phase amplitude, which exceeds the B-phase amplitude from the first to the second intersections thereof. From the second intersection until the third intersection of these phases, the signal F is substantially equal to the B-phase sine wave signal which, during this interval, is greater than the R-phase signal.

Figure 8C:
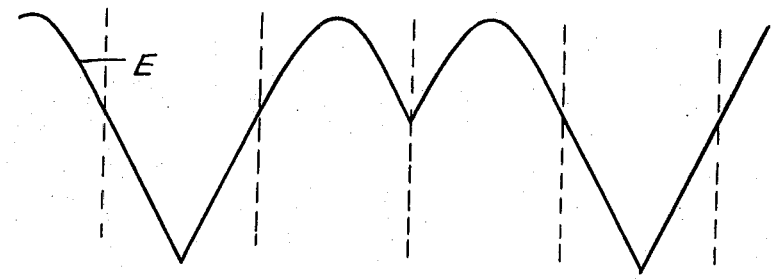
Figure 8D:
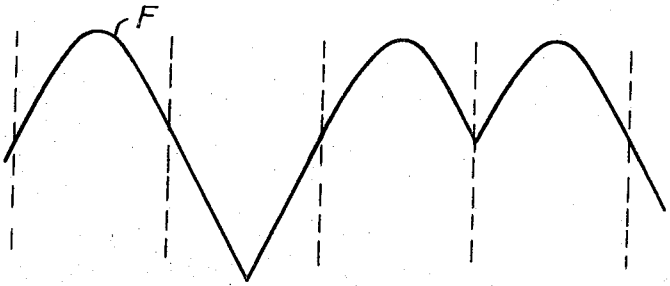

Signals D, E and F, as shown in FIGS. 8B, 8C and 8D, respectively, are compared by amplifiers 80, 82 and 84, together with diodes 81, 83 and 85, respectively, so as to produce across resistor 86 a signal whose amplitude is equal to the smallest of the signals D, E and F. It is seen that, in the interval from point h to point i, signal E exhibits the lowest amplitude. Hence, during this interval, signal E is produced across resistor 86. During the interval from point i to point j, signal F exhibits the lowest amplitude; and it is signal F that is produced across resistor 86. In the interval from point j to point k, signal D exhibits the lowest amplitude. Hence, during this interval, signal D is produced across resistor 86. Furthermore, during these respective intervals, the particular signal which exhibits the lowest amplitude is substantially linear. Hence, during successive intervals h-i, i-j, and j-k, the assembly of successive signals results in the triangle waveform W shown in FIG. 8E. This triangle waveform, which is produced across resistor 86, is supplied to output terminal 89 via buffer 88.

Figure 8E:
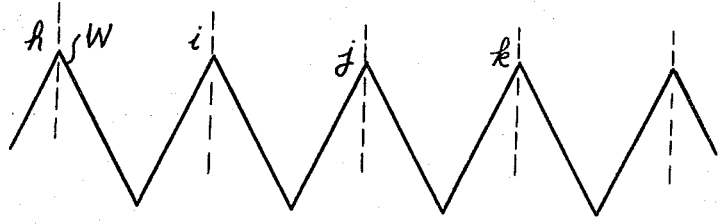

The purpose of resistor 74 and bias source 75 is to ensure a conduction current in one of diodes 63 and 65. Similarly, resistor 76 and bias source 77 ensure a conduction current in one of diodes 67 and 69; and resistor 78 and bias source 79 ensure a conduction current in one of diodes 71 and 73. A similar function is performed by resistor 86 and the bias source 87 in conjunction with diodes 81, 83 and 85. If desired, the polarities of the illustrated diodes, together with the polarities of the illustrated bias sources, all may be reversed. With this modification, signals D, E and F of FIGS. 8B, 8C and 8D, respectively, will appear in inverted form. However, triangle waveform W will remain as illustrated in FIG. 8E.

Thus, in the embodiment of FIG. 7, amplifiers 62 and 64 cooperate to transmit the higher of the instantaneous amplitudes of the R and Y phases, amplifiers 66 and 68 cooperate to transmit the higher of the instantaneous amplitudes of the Y and B phases, and amplifiers 70 and 72 cooperate to transmit the higher of the instantaneous amplitudes of the R and B phases. Of these transmitted amplitudes, amplifiers 80, 82 and 84 cooperate to transmit, or pass, the lowest of such amplitudes. The resultant signal appears as triangle waveform W.

It is appreciated that triangle waveform W produced by triangle waveform synthesizer 30 or 60 exhibits the chopping ratio of n wherein the triangle waveform is synthesized from an n-phase sine wave signal. In the examples described above, the triangle waveform is a 3-chop waveform; and the chopping ratio is equal to three. At relatively low motor speeds wherein the fundamental frequency of the sine wave control signal is low, the switching rate of the SCR's included in the inverter also is relatively low. It is recalled that, when the PWM pulses exhibit a relatively low frequency, there is undesirable harmonic distortion at harmonic frequencies to which the windings of the motor offer relatively low impedance. In particular, at a chopping ratio of three, the fifth and seventh harmonics of the fundamental sine wave frequency are present; and these harmonic components degrade the operation of the motor. In accordance with another aspect of the present invention, now to be described, the triangle wave frequency is increased to a multiple of its fundamental frequency at relatively low motor speeds; and then, as the motor speed increases, the chopping ratio is reduced at different speed values. For example, at relatively low motor speeds at which the frequency of the sine wave signal also is low, the triangle waveform is supplied to the PWM generator with a chopping ratio of, for example, 9. At intermediate motor speeds, wherein the frequency of the sine wave signal also is in this intermediate range, the chopping ratio of the triangle waveform that is supplied to the PWM generator is reduced to 6. Finally, at higher motor speeds, wherein the frequency of the sine wave signal also is higher, the chopping ratio of the triangle waveform supplied to the PWM generator is reduced to 3. Stated otherwise, at relatively low motor speeds, a 9-chop triangle waveform is used. As the motor speed increases above a predetermined value, a 6-chop triangle waveform is used. When the motor speed increases above yet another predetermined value, the 3-chop triangle waveform is used.

It is an advantageous feature of the present invention to produce the 9-chop and 6-chop triangle waveforms from the fundamental, or 3-chop triangle waveform in accordance with an amplitude folding technique. As represented by the waveform diagram of FIG. 9, if the fundamental (3-chop) triangle waveform W exhibits positive and negative peak levels that are normalized to $+3$ and to $-3$, respectively, a pair of so-called folding levels are provided at the $+1$ and $-1$ levels, respectively. These folding levels are seen to be of equal amplitude and opposite polarity (referred to as equal and opposite folding levels). If the fundamental (3-chop) triangle waveform W is folded about the $+1$ and $-1$ folding levels as these levels are exceeded, the resultant folded waveform appears as shown by the solid lines in FIG. 9. That is, as the fundamental (3-chop) triangle waveform W exceeds the $+1$ folding level, the fundamental waveform is inverted so as to gradually decrease, (i.e. slope downwardly from the $+1$ folding level toward the $-1$ folding level. Then, at the point that the fundamental triangle waveform would have reached its $+3$ peak level, the "folded" waveform reaches the $-1$ folding level. The inverted version of the fundamental waveform now increases until it reaches the $+1$ folding level; whereupon the original, fundamental waveform is used once again until it reaches the $-1$ folding level. At that point, the fundamental waveform is inverted so as to increase toward the $+1$ folding level, at which point the inverted waveform now decreases until the $-1$ folding level is reached. Thereupon, the original fundamental waveform is used once again.

It is appreciated that both the fundamental (3-chop) and folded (9-chop) triangle waveforms exhibit common zero-reference crossing levels. From FIG. 3, it is recalled that the zero-reference crossing level of the fundamental (3-chop) triangle waveform W coincides with the zero crossings of each of the R, Y and B phases of the three-phase sine wave signal. As will be described below, this feature is advantageous in "switching" between triangle waveforms having different chopping ratios.

Figure 9:
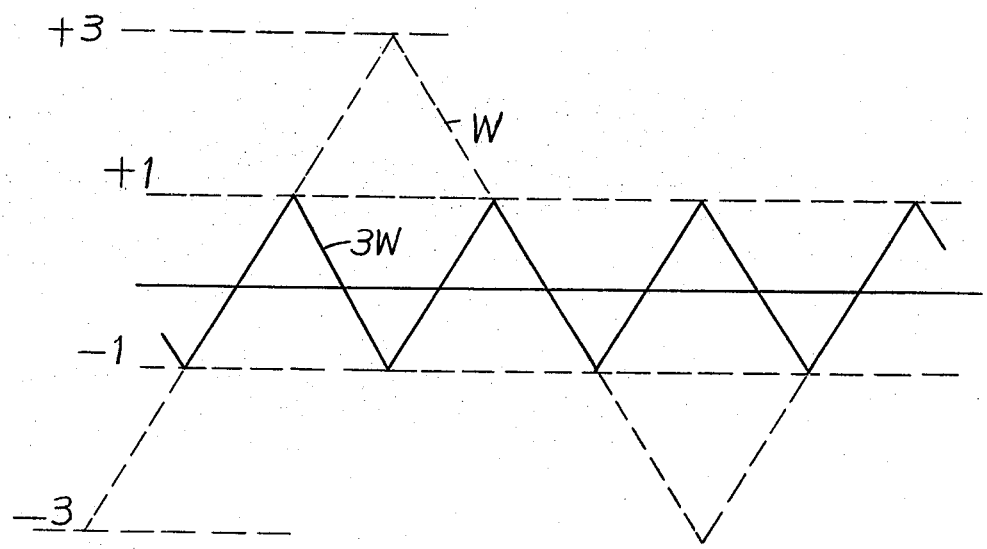
FIGS. 9 and 10 are waveform diagrams representing the amplitude folding technique whereby the frequency of the triangle waveform generated in accordance with the present invention is increased by a predetermined multiple.
Figure 10:
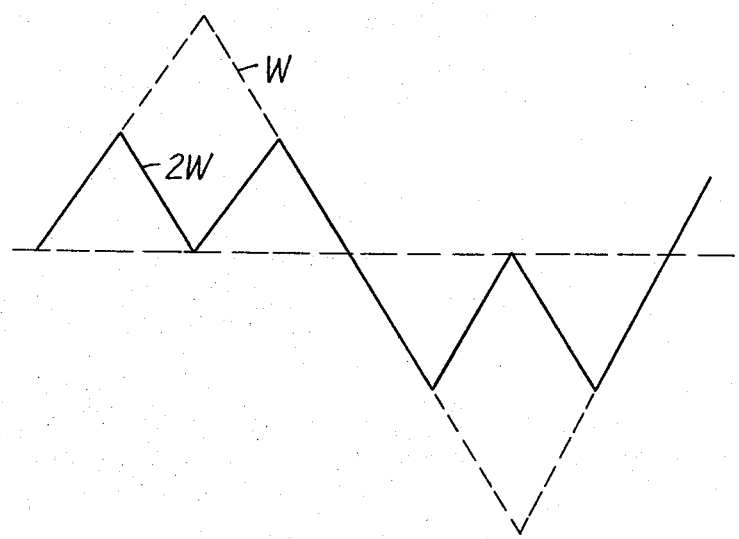

In the amplitude-folding technique represented in FIG. 9, the fundamental (3-chop) triangle waveform is folded about folding levels which are equal to ⅓ the positive and negative peak levels. This results in a 9-chop triangle waveform, wherein the fundamental triangle frequency is multiplied by a factor of three. It is desirable, in motor control applications, to produce a 6-chop triangle waveform in which the fundamental triangle frequency is multiplied by a factor of 2. The 6-chop triangle waveform is illustrated in FIG. 10. In this arrangement, the positive and negative folding levels are selected at ½ the positive and negative peak levels. When the fundamental (3-chop) triangle waveform reaches the positive folding level, the fundamental waveform is inverted, as represented by the solid lines in FIG. 10. During the negative half-cycle of the fundamental triangle waveform, when this fundamental waveform reaches the negative folding level, the waveform is inverted, as also shown by the solid lines. Once the fundamental (3-chop) triangle waveform is reduced in amplitude so as to be equal to or less than the respective folding levels, the original, "un-folded" waveform is selected.

Although not shown herein, it may be appreciated that higher order triangle wave frequencies may be produced, such as a multiple of five or seven times the fundamental (3-chop) triangle wave frequency, by "folding" the fundamental triangle waveform about other suitable folding levels.

Figure 11:
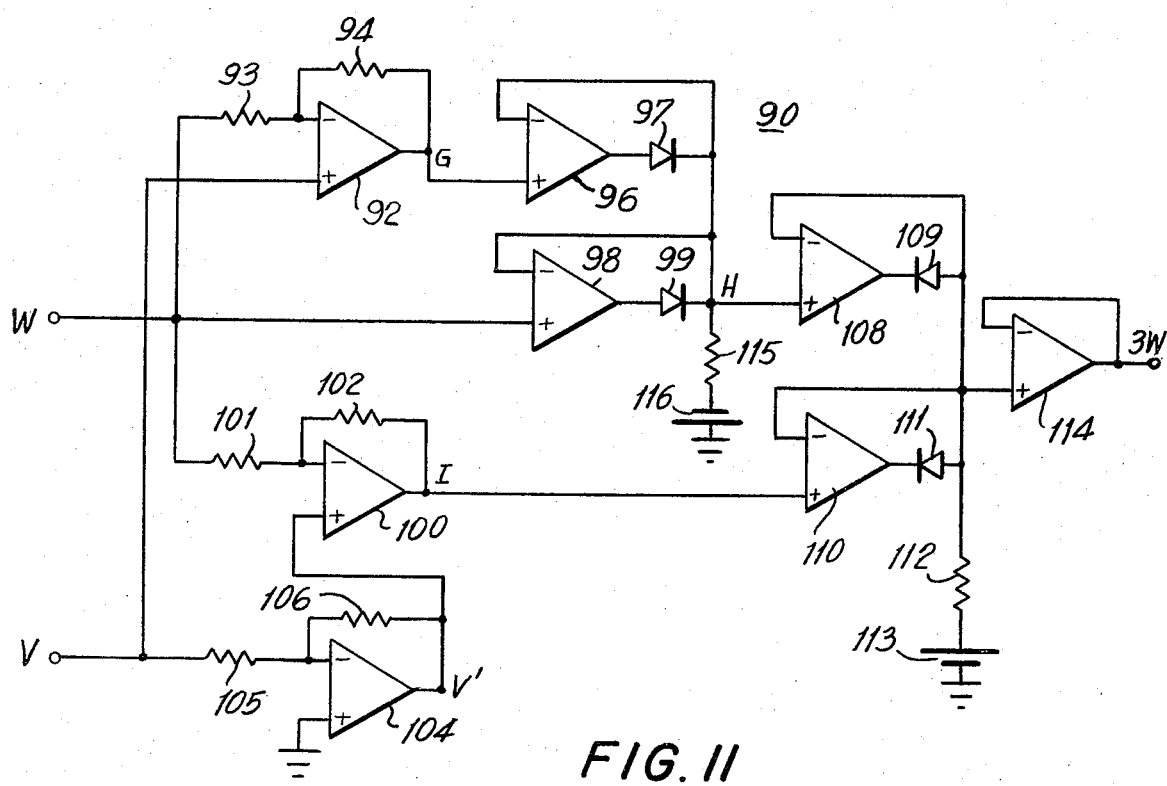
FIG. 11 is a schematic representation of one embodiment of an amplitude folding circuit.

One embodiment of an amplitude-folding circuit which is adapted to produce a 9-chop triangle waveform from a fundamental (3-chop) triangle waveform is illustrated in FIG. 11. This amplitude-folding circuit 90 is comprised of a comparator formed of operational amplifiers 96 and 98 and another comparator formed of operational amplifiers 108 and 110. The comparators illustrated in FIG. 11 are comprised of operational amplifiers having non-inverting (+) and inverting (−) inputs; which operational amplifiers may be similar to those described hereinabove.

In addition to the aforementioned comparators, amplitude-folding circuit 90 includes a level-shifting circuit comprised of an operational amplifier 92, and another level-shifting circuit formed of operational amplifiers 100 and 104. Operational amplifier 92 is adapted to invert the fundamental (3-chop) triangle waveform W and to downwardly shift the average level of this inverted waveform. To this effect, an input resistor 93 is connected to supply the fundamental (3-chop) triangle waveform to the inverting (−) input of operational amplifier 92, and a feedback resistor 94 is connected between the output thereof and its inverting input. A negative amplitude folding voltage level V, provided by a suitable bias source, is supplied to the inverting (+) input of operational amplifier 92.

The level-shifting circuit comprised of operational amplifiers 100 and 104 is adapted to invert the fundamental (3-chop) triangle waveform W and to positively shift the average level of this inverted fundamental waveform. To this effect, an input resistor 101 is connected at the inverting (−) input of operational amplifier 100 to supply the fundamental triangle waveform W thereto, and a feedback resistor 102 is connected between the output of this operational amplifier and its inverting input. A positive folding voltage V' is supplied to the non-inverting (+) input operational amplifier 100. In the illustrated embodiment, the positive folding voltage V' is produced by supplying the negative folding voltage V to an inverting amplifier constituted by operational amplifier 104 whose inverting (−) input is connected via a resistor 105 to receive the negative folding voltage V, and whose output is connected via a feedback resistor 106 to its inverting input. The non-inverting (+) input of operational amplifier 104 is connected to ground. Preferably, operational amplifier 104 exhibits unity gain (−1) such that the magnitude of the negative folding voltage V which is supplied as an offset voltage to operational amplifier 92 is equal and opposite (in polarity) to the positive folding voltage V' which is supplied as a positive offset voltage to operational amplifier 100.

The comparator comprised of operational amplifiers 96 and 98, together with diodes 97 and 99, is coupled to a resistor 115 which is supplied with a bias potential produced by a bias source 116. This comparator is adapted to supply the higher of the instantaneous amplitudes of the level-shifted inverted fundamental waveform produced by operational amplifier 92 and the original fundamental waveform W. This voltage, which is produced across resistor 115, is supplied to another comparator which is comprised of operational amplifiers 108 and 110. These operational amplifiers, which are similar to operational amplifiers 96 and 98, and which are connected in a similar manner, are coupled via diodes 109 and 111, respectively, to a resistor 112. Diodes 109 and 111 are poled so as to supply to resistor 112 the lower of the instantaneous amplitudes of the level-shifted inverted fundamental waveform produced by comparator 100 and the voltage across resistor 115. Resistor 112 is supplied with a bias potential produced by, for example, bias source 113. The voltage across resistor 112 is an amplitude-folded version of fundamental triangle waveform W; and this amplitude-folded triangle waveform is supplied via a non-inverting buffer 114 to an output terminal.

The operation of amplitude-folding circuit 90, shown in FIG. 11, now will be described with reference to the waveforms illustrated in FIGS. 12A–12E. Let it be assumed that the fundamental (3-chop) triangle waveform W appears as shown in FIG. 12A. Let it further be assumed that the amplitude folding voltage V is produced by any conventional source of DC voltage level. The gains of operational amplifiers 92, 100 and 104 may be any desired amount. As is recognized by those of ordinary skill in the art, such gain is determined by the input and feedback resistors which are connected to each operational amplifier. For convenience and simplification, it is assumed that the gain of each of operational amplifiers 92, 100 and 104 is equal to unity.

Operational amplifier 92 inverts the fundamental (3-chop) triangle waveform W; and the folding voltage V supplied to its non-inverting input serves as an offset voltage. Hence, operational amplifier 92 produces signal G, shown in FIG. 12B. Signal G appears as an inverted, level-shifted fundamental triangle waveform. The direction in which the inverted triangle waveform is shifted is seen to be in the negative direction.

Operational amplifier 100 inverts the fundamental (3-chop) triangle waveform W; and level-shifts this inverted triangle waveform by an amount determined by the offset folding voltage V' which is supplied to its non-inverting input. This offset folding voltage V' is produced by operational amplifier 104 and is seen to be equal and opposite (in polarity) to folding voltage V.

The inverted, level-shifted version of the fundamental waveform produced at the output of operational amplifier 100 appears as signal I, shown in 12C. The direction in which this signal I is shifted is seen to be positive.

The comparator circuit formed of operational amplifiers 96 and 98, together with diodes 97 and 99, selects the higher of the instantaneous amplitudes of signals G and W. This selected signal H, produced across resistor 115, is illustrated in FIG. 12D. It is seen that the instantaneous amplitude of the fundamental (3-chop) triangle waveform W exceeds the instantaneous amplitude of signal G until a point o is reached. At that point, the instantaneous amplitude of signal G is higher. Hence, at that point, this comparator circuit supplies the amplitude of signal G across resistor 115, as shown in FIG. 12D. Then, at point p, the instantaneous amplitude of the fundamental (3-chop) triangle waveform W once again exceeds the instantaneous amplitude of signal G. Hence, from point p, this comparator circuit supplies the fundamental (3-chop) triangle waveform W to resistor 115. The resultant H which is produced across this resistor is as shown in FIG. 12D.

Referring now to the comparator circuit comprised of operational amplifiers 108 and 110, together with diodes 109 and 111, this comparator circuit is adapted to produce across resistor 112 the lower of the instantaneous amplitudes of signals H (FIG. 12D) and I (FIG. 12C). It is seen that, initially, the instantaneous amplitude of signal H is smaller; and this signal is supplied across resistor 112. At point q, signal H continues to increase and signal I decreases. Hence, from point q to point r, this comparator circuit supplies signal I across resistor 112. Then, at point r, signal I continues to increase and signal H decreases. Hence, from point r, this comparator circuit supplies signal H across resistor 112. It also is seen that, at points o and p, the instantaneous amplitude of signal H is less than that of signal I. Then, at point s, the amplitude of signal H continues to increase while that of signal I continues to decrease. Hence, at point s, this comparator circuit supplies signal I across resistor 112. The instantaneous amplitude of signal I remains less than that of signal H until point t is reached; whereupon this comparator circuit supplies the amplitude of signal H across resistor 112.

From the foregoing description, and as is apparent from FIG. 12E, the resultant signal which is produced across resistor 112 and which is supplied via buffer 114 to the output terminal, is the 9-chop triangle waveform. This triangle waveform has a frequency that is three times (3×) the fundamental triangle wave frequency of the 3-chop triangle waveform W. Hence, the amplitude-folded triangle waveform, whose frequency is multiplied by a factor of three relative to the frequency of the 3-chop triangle waveform, is designated 3W.

In the amplitude folding circuit 90 illustrated in FIG. 11, resistor 115, together with the bias source 116 ensures that conduction currents will flow through diodes 97 and 99. Similarly, resistor 112 and bias source 113 ensure that conduction currents will flow through diodes 109 and 111.

The illustrated amplitude-folding circuit has been described as producing the 9-chop triangle waveform. This very same circuit can be utilized to produce the 6-chop triangle waveform merely by changing the level of folding voltage V. To produce the 9-chop triangle waveform, it is assumed that the folding voltage V is equal to ⅓ of the positive (or negative) peak level attained by the fundamental (3-chop) triangle waveform W. To produce the 6-chop triangle waveform, the folding voltage V is selected to be equal to ½ the peak level attained by the fundamental (3-chop) triangle waveform W. If desired, the polarity of the input folding voltage V may be reversed and, consistent with this reversal, the illustrated diodes should be poled in the opposite directions and the polarities of bias sources 113 and 116 should be reversed. Alternatively, the signals supplied to the non-inverting (+) inputs of operational amplifiers 92 and 100 may be interchanged.

As mentioned above, preferred operation of the PWM-driven inverter is attained when the cycling rate of the SCR's included in that inverter is not more than about 400 Hz. Since the triangle waveform which is generated by triangle wave synthesizer 30 or 60 is in precise synchronism with the sine wave signal, the frequency of the triangle waveform will change as the frequency of the sine wave signal changes. Therefore, it is preferred to change the chopping ratio at different discrete frequencies of the sine wave signal so that the SCR cycling rate will not be excessive. In accordance with one embodiment, when the sine wave frequency is in the range of about 25 to 45 Hz, the triangle waveform should have a chopping ratio of 9. This 9-chop triangle wave frequency, which is used to generate the PWM pulses, thus will be in the range of 225 Hz to 405 Hz. When the sine wave frequency reaches 45 Hz, the chopping ratio of the triangle waveform should be changed over to 6. This 6-chop triangle waveform should be used to generate the PWM pulses when the sine wave frequency is in the range of 45 Hz to 80 Hz. Hence, this 6-chop triangle wave frequency will be in the range of 270 Hz to 480 Hz. When the sine wave frequency reaches 80 Hz, the chopping ratio should be reduced to 3. Hence, the 3-chop triangle wave frequency will exhibit an approximate lower frequency value of about 240 Hz. When the chopping ratio is changed over at the approximate sine wave frequencies mentioned above, the PWM pulses which are supplied to the inverter will switch the SCR's at a high enough rate such that unwanted harmonics which can disturb proper operation of the driven motor are avoided. At the same time, the maximum switching rate of the SCR's is maintained below a reasonable limit.

Figure 13:
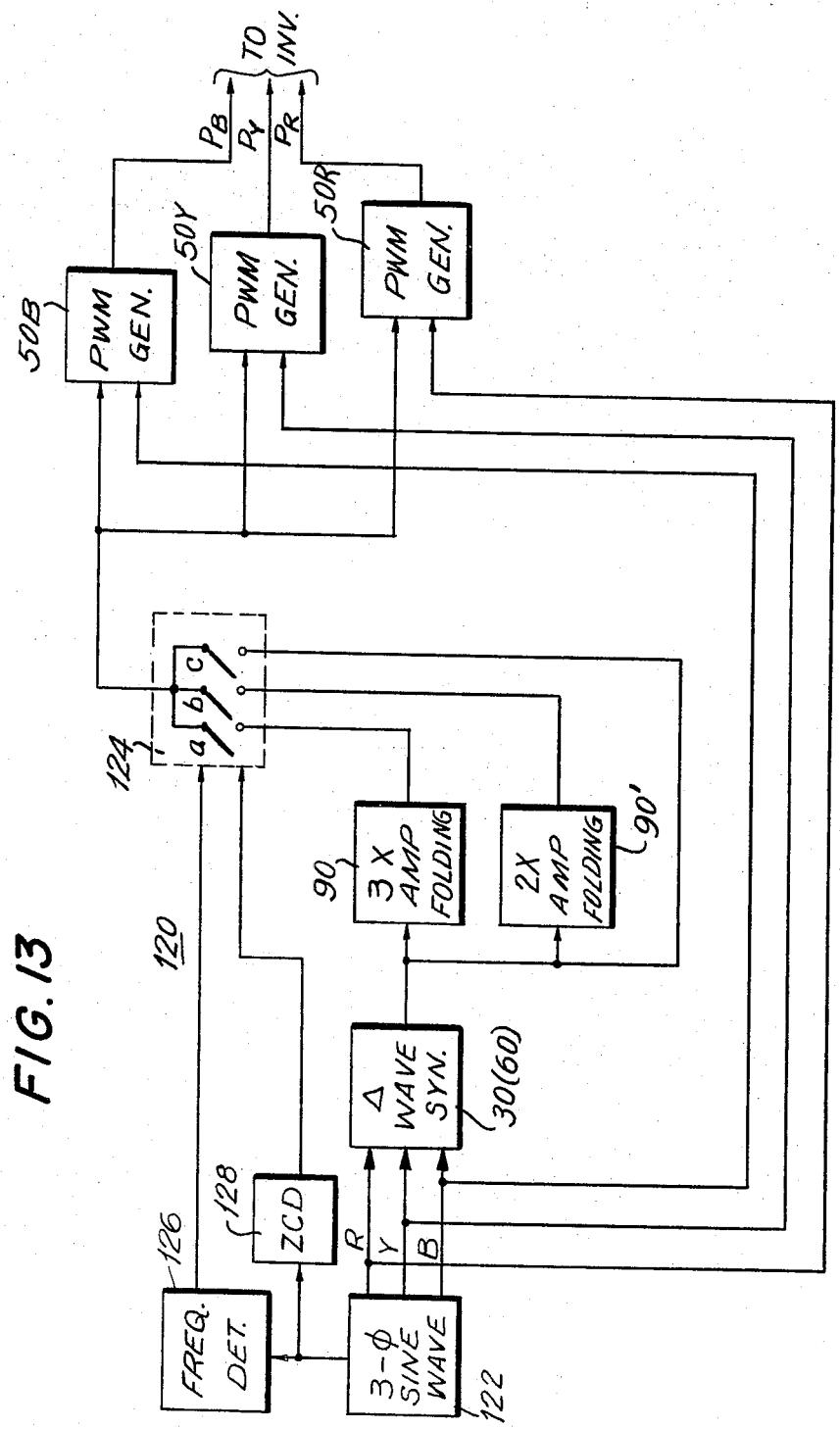
FIG. 13 is a block diagram representing how the present invention is used to generate PWM pulses for driving a PWM-type inverter.

Turning now to FIG. 13, there is illustrated a block diagram of the overall apparatus in which the present invention finds ready application and in which the frequency of the triangle waveform that is used to generate the PWM pulses is controlled as a function of motor speed. In FIG. 13, it is assumed that PWM pulses are supplied to each of the R, Y and B phases. Accordingly, a separate PWM generator 50R, 50Y and 50B is provided for these respective phases. Each PWM generator may be of the type described previously with respect to FIG. 5. To generate the PWM pulses, it is recalled that the triangle waveform and a respective phase of the sine wave signal are supplied to the PWM generator. In this regard, a source 122 of three-phase sine wave signals is provided so as to supply the R-phase, the Y-phase and the B-phase signals to PWM generators 50R, 50Y and 50B, respectively. In addition, a triangle waveform is supplied in common to each of these PWM generators. In the illustrated embodiment, the triangle waveform may be constituted either by the fundamental (3-chop) triangle waveform which is generated by triangle wave synthesizer 30 or 60 (shown in FIGS. 4 and 7), or the 9-chop triangle waveform produced by amplitude folding circuit 90 (shown in FIG.

11), or the 6-chop triangle waveform produced by amplitude folding circuit 90' (also shown in FIG. 11). A selected one of these fundamental (3-chop), 6-chop and 9-chop triangle waveforms produced by triangle wave synthesizer 30 (60), amplitude folding circuit 90' and amplitude folding circuit 90, respectively, is supplied in common to PWM generators 50R, 50Y and 50B by a switching circuit 124.

Switching circuit 124 may comprise an electronic switching arrangement formed of conventional transistors, diodes, or other solid-state switching elements. For convenience, and in the interest of simplification, the switching circuit is shown herein as an electro-mechanical switch having a plurality of moveable contacts a, b and c connected to amplitude folding circuit 90 (referred to as the 3× amplitude folding circuit), amplitude folding circuit 90' (referred to as the 2× amplitude folding circuit) and triangle wave synthesizer 30 (60), respectively. Switching circuit 124 further includes a selection control input (or inputs) adapted to receive a signal (or signals) representing which of contacts a, b and c should be closed; and an energize input adapted to receive an energize signal to close the selected contact.

The selection of a particular contact a, b and c of switching circuit 124 which is to be closed is determined as a function of the frequency of the sine wave signal provided by source 122. A frequency detector 126 is connected to source 122 to detect the frequency of the sine wave signal produced by the source. When this sine wave frequency is within its lower range, such as the range of 25 to 45 Hz, frequency detector 126 supplies a selection control signal (or signals) to switching circuit 124 for selecting contact a to be closed. When the sine wave frequency is within its middle frequency range, such as from 45 to 80 Hz, the frequency detector supplies a selection control signal to switching circuit 124 to select contact b to be closed. Likewise, when the sine wave frequency is within its higher frequency range, such as greater than 80 Hz, frequency detector 126 supplies a selection control signal (or signals) to the switching circuit to select contact c to be closed.

Advantageously, the selected one of contacts a, b and c of switching circuit 124 should be closed when a particular one of phases R, Y and B of the sine wave signal crosses its zero reference level. It is recalled from FIG. 3 that the fundamental (3-chop) triangle waveform crosses the zero reference level coincidentally with each of the R, Y and B phases. From FIGS. 9 and 10, it is seen that the 9-chop and 6-chop triangle waveforms cross the zero reference level in coincidence with the zero crossings of the fundamental (3-chop) triangle waveform. Thus, at the zero-crossing of any particular phase of the sine wave signal, all of the triangle waveforms also exhibit their zero-crossing. Zero-crossing detector 128 is connected to receive any particular phase of the sine wave signal produced by source 122 and to detect when the received phase crosses its zero reference level. At that zero-crossing, zero cross detector 128 supplies the energizing signal to switching circuit 124. This energizing signal serves to close the selected one of contacts a, b and c, while opening (or maintaining open) the remaining non-selected contacts.

Although not shown herein, at very low sine wave frequencies, a non-synchronized, or asynchronous, triangle waveform generator (not shown) is used to supply a triangle waveform of, for example, 300 Hz, to PWM generators 50R, 50Y and 50B. At such low sine wave frequencies which, of course, correspond to very low motor speeds, the problems due to subharmonics or unwanted harmonic currents are very minor. To supply such an asynchronous triangle waveform to the PWM generators, switching circuit 124 may be provided with yet another moveable contact which is selectively operated by the selection control signal (or signals) produced by frequency detector 126 to couple the asynchronous triangle waveform to the PWM generators.

In operation, at very low motor speeds, that is, when the sine wave frequency is within its very low range, the aforementioned asynchronous triangle waveform, whose frequency is approximately 300 Hz, is supplied to PWM generators 50R, 50Y and 50B. Contacts a, b and c of switching circuit 124 remain open. Each of the PWM generators generates a PWM pulse signal at the intersections of this asynchronous triangle waveform and the respective R, Y and B phases of the sine wave signal. These PWM pulses $P_R$, $P_Y$ and $P_B$ are supplied to the PWM-driven inverter which, in turn, supplies energizing currents to the R, Y and B phases of the motor. Let it be assumed that the frequency of the three-phase sine wave signal is increased so as to correspondingly increase the motor speed. When frequency detector 126 detects the sine wave frequency of about 25 Hz, a selection control signal (or signals) is generated to select contact a to be closed. Let it also be assumed that zero cross detector 128 is connected to detect the zero-crossings of the R-phase sine wave signal. At the detected zero-crossing, zero cross detector 128 supplies the energizing signal to switching circuit 124, whereupon contact a is closed and all of the remaining contacts are opened. Consequently, the 9-chop triangle waveform produced by 3× amplitude folding circuit 90 is supplied in common to PWM generators 50R, 50Y and 50B. This 9-chop triangle waveform is used in each of the PWM generators to produce the respective PWM pulses $P_R$, $P_Y$ and $P_B$ in accordance with the aforedescribed triangle intercept technique.

If the motor speed is further increased, the sine wave frequency is increased; and when frequency detector 126 detects that the sine wave frequency reaches 45 Hz, the selection control signal (or signals) supplied thereby to switching circuit 124 selects contact b to be closed. Upon detecting the zero-crossing to the R-phase sine wave signal, zero cross detector 128 supplies the energize signal to the switching circuit; whereupon selected contact b is closed and the remaining contacts are open. Hence, the 6-chop triangle waveform, produced by 2× amplitude folding circuit 90' is supplied in common to PWM generators 50R, 50Y and 50B. These PWM generators operate in the manner discussed in detail hereinabove so as to produce PWM pulses $P_R$, $P_Y$ and $P_B$ associated with the R, Y and B phases, respectively.

If the speed of the driven motor is further increased, the sine wave frequency increases. When frequency detector 126 detects that this sine wave frequency is about 80 Hz, the selection control signal (or signals) supplied therefrom to switching circuit 124 selects contact c to be closed. After this selection control signal (or signals) is produced, zero cross detector 128 supplies the energizing signal to the switching circuit in response to the next-detected zero-crossing of the R-phase sine wave signal. At that time, contact c is closed and the remaining contacts in switching circuit 124 are opened. Thus, the fundamental (3-chop) triangle waveform is supplied from triangle wave synthesizer 30 (60) to PWM generators 50R, 50Y and 50B. These PWM generators now supply these PWM pulses $P_R$, $P_Y$ and $P_B$ to the respective R, Y and B phases in response to the intersection of each fundamental (3-chop) triangle waveform and corresponding phase of the three-phase sine wave signal.

While the aforegoing description has explained the operation of the apparatus illustrated in FIG. 13 as the speed of the driven motor increased, it should be readily appreciated by those of ordinary skill in the art that the apparatus operates in an analogous manner when the speed of the motor is decreased. Thus, at the higher operating speeds, the fundamental (3-chop) triangle waveform is supplied by switching circuit 124 to the PWM generators. As the motor speed is reduced such that the sine wave frequency decreases to about 80 Hz, switching circuit 124 is operated to supply the 6-chop triangle waveform to the PWM generators. As the motor speed is further reduced, the sine wave frequency decreases to about 45 Hz, whereupon the switching circuit is operated to supply the 9-chop triangle waveform to the PWM generators.

Thus, it is seen that switching circuit 124 is controlled by frequency detector 126 and by zero cross detector 128 to mutually exclusively supply one of the fundamental (3-chop), 6-chop and 9-chop triangle waveforms to the PWM generators.

It is appreciated that the discrete frequency levels of the sine wave frequency at which switching circuit 124 is changed over need not be limited to the particular examples described hereinabove. For example, if the maximum frequency of the sine wave signal is about 60 Hz, then frequency detector 126 may be adapted to produce selection control signals at the sine wave frequencies of 25 Hz, 38 Hz and 50 Hz. At frequencies below 25 Hz, the aforementioned asynchronous triangle waveform (not shown) may be supplied to the PWM generators. In the range of 25 Hz to 38 Hz, switching circuit 124 may be controlled to supply the 9-chop triangle waveform, to the PWM generators. In the range from 38 Hz to 50 Hz, the switching circuit may be controlled to supply the 6-chop triangle waveform to the PWM generators. At sine wave frequencies above 50 Hz, switching circuit 124 may be controlled to supply the fundamental (3-chop) triangle waveform to the PWM generators. Of course, for control over other motor speed ranges, correspondingly different discrete sine wave frequency levels may be detected to control the operation of switching circuit 124.

As mentioned above, the PWM voltages produced at the outputs of PWM generators 50R, 50Y and 50B contain various harmonic components. The frequencies of these harmonic components are, of course, determined by the particular triangle wave frequency which is supplied to the PWM generators. Moreover, the magnitudes of these harmonic components are a function of the amplitude of the sine wave signal. It has been found that the dominant harmonic components in the PWM voltages are at frequencies equal to twice the chopping ratio, plus or minus one. Thus, when the fundamental (3-chop) triangle waveform is supplied by switching circuit 124 to the PWM generators, the dominant harmonics are the fifth and seventh harmonics of the sine wave frequency. When switching circuit 124 supplies the 6-chop triangle waveform to the PWM generators, the dominant harmonics in the PWM voltages are the eleventh and thirteenth harmonics of the sine wave frequencies. Likewise, when the switching circuit supplies the 9-chop triangle waveform to the PWM generators, the dominant harmonics in the PWM voltages are the seventeenth and nineteenth harmonics of the sine wave frequency.

It is recalled that unwanted harmonic components result in harmonic currents which flow in the respective phases of the motor, thereby increasing the copper losses therein. Such harmonic currents are limited by the impedance of the motor windings. This impedance is relatively high at higher frequencies. Thus, to maintain the harmonic currents at low levels, it is preferred that the triangle wave frequency be relatively high. For example, with a sine wave frequency of 30 Hz, the chopping ratio is selected to be 9 and the dominant harmonics are the seventeenth (with a frequency of 510 Hz) and the nineteenth (with a frequency of 570 Hz). The impedance of the motor windings at these high harmonic frequencies likewise is high. Hence, the seventeenth harmonic current and the nineteenth harmonic current are limited by such high impedance so as to have minimal affect on the operation of the motor. Furthermore, if the sine wave frequency is 30 Hz, and the 9-chop triangle waveform is supplied to the PWM generators, the respective phases of the PWM-driven inverter are switched at a 270 Hz rate. This is well within the upper cycling rate of the SCR's.

Harmonic analysis of the fundamental (3-chop), 6-chop and 9-chop triangle waveforms have resulted in the following:

|  | 3-chop waveform | | 6-chop waveform | | 9-chop waveform | |
| --- | --- | --- | --- | --- | --- | --- |
| dominant harmonics | 5th | 7th | 11th | 13th | 17th | 19th |
| maximum harmonic voltage | .25 | .54 | .34 | .47 | .37 | .37 |
| ratio of $\frac{\text{sine peak}}{\text{triangle peak}}$ | .42 | .6 | .46 | .57 | .6 | .6 |

In the foregoing Table, the actual value of the maximum harmonic voltage is found by multiplying the indicated decimal portion by the DC voltage of the inverter power supply.

Although not indicated in the above Table, when the 6-chop triangle waveform is supplied to the PWM generators, the PWM voltages are accompanied by fifth and seventh harmonics which, however, exhibit relatively low levels. For example, at the maximum eleventh harmonic voltage, the fifth harmonic voltage level is equal to 0.09 and the seventh harmonic voltage level is equal to 0.005. At the maximum thirteenth harmonic voltage level, the fifth harmonic voltage level is equal to 0.12 and the seventh harmonic voltage level is equal to 0.02. Also, when the 9-chop triangle waveform is supplied to the PWM generators, the PWM voltages are accompanied by seventh and eleventh harmonic components. At the maximum voltage level for the seventeenth and nineteenth harmonics, the seventh and eleventh harmonic voltage levels are equal to 0.09. Thus, it is appreciated that the lower order harmonic components exhibit very low voltage levels so as to have minimal effect upon the operation of the motor.

While the present invention has been particularly shown and described with reference to certain preferred embodiments, it should be readily apparent to those of ordinary skill in the art that various changes and modifications in form and details may be made without departing from the spirit and scope of the invention. For example, the triangle waveform synthesizer shown in FIGS. 4 and 7 has been particularly described for synthesizing a triangle waveform from a three-phase sine wave signal. The teachings of the present invention may be used to synthesize a triangle waveform from an n-phase sine wave signal, wherein n is an integer not necessarily limited to 3. If the fundamental frequency of the n-phase sine wave signal is represented as f, then the frequency of the synthesized triangle waveform will be equal to nf. Furthermore, although FIG. 3 represents that the triangle waveform is synthesized by selecting segments of each phase of the sine wave signal which are within a predetermined angular distance from the zerocrossing of that phase, it should be appreciated that the crossing level need not be limited solely to the zero level. Rather, other reference levels may be used, as desired. In the FIG. 3 illustration, it is more accurate to say that the segments of respective phases are selected if they are within the predetermined angular distance from the average level of the sine wave signals.

It also should be readily appreciated that the particular circuit configurations for the triangle wave synthesizer, the PWM generator and the amplitude folding circuit merely are illustrative. Other circuits can be constructed which are capable of carrying out the functions described hereinabove with respect to these particular embodiments.

It is, therefore, intended that the appended claims be interpreted as including the foregoing as well as various other changes and modifications.

What is claimed is:

1. Apparatus for generating a triangle waveform, having substantially linearly sloped, gradually increasing and decreasing edges, of frequency nf from an n-phase sine wave signal, wherein n is an integer, each phase having a fundamental frequency f, said apparatus comprising detecting means for detecting when a segment of any of said n phases of said sine wave signal is within a predetermined angular amount from a reference crossing level; and selecting means for selecting successive ones of said detected segments to synthesize said triangle waveform.

2. The apparatus of claim 1 wherein said detecting means comprises comparator means for comparing each phase of said sine wave to the remaining phases to indicate the amplitude of each phase relative to the amplitudes of the other phases.

3. The apparatus of claim 2 wherein n=3, and said comparator means comprises a first comparator for comparing the first phase of said sine wave to the second phase thereof to indicate which of said first and second phases is greater, a second comparator for comparing the first phase of said sine wave to the third phase thereof to indicate which of said first and third phases is greater, and a third comparator for comparing the second phase of said sine wave to the third phase thereof to indicate which of said second and third phases is greater.

4. The apparatus of claim 3 wherein said selecting means comprises gating means for selectively gating said first, second or third phase of said sine wave in accordance with predetermined indications of said first, second and third comparators.

5. The apparatus of claim 4 wherein said gating means comprises a first gate circuit for passing said first phase of said sine wave when (a) said first phase is less than said second phase and greater than said third phase, or (b) said first phase is greater than said second phase and less than said third phase; a second gate circuit for passing said second phase when (a) said second phase is less than said third phase and greater than said first phase, or (b) said second phase is greater than said third phase and less than said first phase; and a third gate circuit for passing said third phase when (a) said third phase is less than said first phase and greater than said second phase, or (b) said third phase is greater than said first phase and less than said second phase.

6. The apparatus of claim 5 wherein each of said first, second and third gate circuits comprises an analog gate having an input for receiving a respective phase of said sine wave signal and a control input for receiving a gating signal, and an exclusive-OR gate connected to a respective pair of said comparators for producing said gating signal as a function of the amplitudes of the phases compared by said respective pair of comparators.

7. The apparatus of claim 6 wherein the exclusive-OR gate of said first gate circuit is coupled to said first and second comparators, the exclusive-OR gate of said second gate circuit is coupled to said first and third comparators, and the exclusive-OR gate of said third gate circuit is coupled to said second and third comparators.

8. The apparatus of claim 7 wherein said first comparator produces a first binary signal when the amplitude of said first phase exceeds the amplitude of said second phase and a second binary signal when the amplitude of said second phase exceeds the amplitude of said first phase; said second comparator produces said first binary signal when the amplitude of said third phase exceeds the amplitude of said first phase and said second binary signal when the amplitude of said first phase exceeds the amplitude of said third phase; and said third comparator produces said first binary signal when the amplitude of said secondphase exceeds the amplitude of said third phase and said second binary signal when the amplitude of said third phase exceeds the amplitude of said second phase.

9. The apparatus of claim 2 wherein n=3; and said comparator means comprises a first comparator for comparing the first phase signal of said sine wave to the second phase signal thereof to pass the one of said first and second phase signals which is greater, a second comparator for comparing the second phase signal of said sine wave to the third phase signal thereof to pass the one of said second and third phase signals which is greater, and a third comparator for comparing said third phase signal of said sine wave to said first phase signal thereof to pass to one of said third and first phase signals which is greater.

10. The apparatus of claim 9 wherein said selecting means comprises means for comparing all of the signals passed by said first, second and third comparators to produce an output triangle waveform constituted by the passed signal whose instantaneous amplitude is the lowest.

11. The apparatus of claim 1 further comprising frequency multiplying means for multiplying the frequency of said triangle waveform to a frequency mf, wherein m is a integer greater than n.

12. The apparatus of claim 11 wherein said frequency multiplying means comprises amplitude folding means for folding said triangle waveform of frequency nf about first and second folding levels of equal amplitudes and opposite polarity whenever said triangle waveform reaches said first and second folding levels, to produce an amplitude-folded triangle waveform of frequency mf and of peak levels determined by said first and second folding levels.

13. The apparatus of claim 12 wherein said amplitude folding means comprises a source of folding voltage equal to said folding level; level increase means for increasing the average level of an inverted version of said triangle waveform; level decrease means for decreasing the average level of an inverted version of said triangle waveform; first selecting means for selecting the larger of the instantaneous amplitudes of said triangle waveform and the level-decreased inverted version of said triangle waveform to produce an output signal; and second selecting means for selecting the smaller of the instantaneous amplitudes of said output signal and the level-increased inverted version of said triangle waveform, thereby to produce said amplitude-folded triangle waveform of frequency mf.

14. Apparatus for generating an n-phase pulse width modulated (PWM) waveform particularly adapted for energizing an n-phase electrical motor, wherein n is an integer, said apparatus comprising a source of n-phase sine wave signal, each phase having a fundamental frequency f, triangle waveform generating means for generating a triangle waveform of frequency mf from said n-phase sine wave signal wherein m is an integer, said triangle waveform having substantially linearly sloped, gradually increasing and decreasing edges, said triangle waveform generating means including detecting means for detecting when a segment of any of said n phases of said sine wave signal is within a predetermined angular amount from a reference crossing level, and selecting means for selecting successive ones of said detected segments to synthesize said triangle waveform; and n comparing means, a respective comparing means being provided for each phase for comparing said triangle waveform to an associated phase of said sine wave signal to produce a pulse transition at each intersection of said triangle waveform and said associated phase of said sine wave.

15. The apparatus of claim 14, further comprising attenuating means for attenuating the amplitude of each phase of said sine wave applied to respective ones of said comparing means so that the peak level of the attenuated sine wave is less than the peak level of said triangle waveform.

16. The apparatus of claim 14, wherein $m > 1$; and further comprising amplitude folding means coupled to said selecting means for folding said triangle waveform produced by said selecting means about first and second folding levels of equal amplitude and opposite polarity whenever said triangle waveform reaches said first and second folding levels, to produce an amplitude-folded triangle waveform of frequency mf and of peak levels determined by said first and second folding levels.

17. A method of synthesizing a triangle waveform, having substantially linearly sloped, gradually increasing and decreasing edges, of a frequency nf from an n-phase sine wave signal, wherein n is an integer, each phase having a fundamental frequency f, comprising the steps of detecting when a segment of any of said n phases of said sine wave signal is within a predetermined angular amount from a reference crossing level; and assembling a succession of said detected segments from all phases of said sine wave to synthesize said triangle waveform from said detected segments.

18. The method of claim 17 wherein $n = 3$; and wherein said step of assembling comprises the steps of (a) passing a segment of the first phase of said sine wave when said segment of said first phase is within said predetermined angular amount on either side of the reference crossing level, (b) changing over to pass a segment of the second phase of said sine wave when said segment of said second phase is within said predetermined angular amount on either side of the reference crossing level, (c) changing over to pass a segment of the third phase of said sine wave when said segment of said third phase is within said predetermined angular amount on either side of the reference crossing level, and (d) repeating steps (a) through (c).

19. A method of synthesizing a triangle waveform, having substantially linearly sloped, gradually increasing and decreasing edges, of a frequency mnf from an n-phase sine wave signal, wherein m and n are integers greater than 1, each phase having a fundamental frequency f, comprising the steps of detecting when a segment of any of said n phases of said sine wave signal is within a predetermined angular amount from a reference crossing level; assembling a succession of said detected segments from all phases of said sine wave to synthesize said triangle waveform from said detected segments; and folding said synthesized triangle waveform about first and second folding levels of equal amplitude and opposite polarity whenever said triangle waveform reaches said first and second folding levels, to produce an amplitude-folded triangle waveform having peak levels determined by said first and second folding levels.

20. A method of generating an n-phase pulse width modulated (PWM) waveform, particularly adapted for energizing an n-phase electrical motor, from an n-phase sine wave signal, wherein n is an integer, comprising the steps of synthesizing a triangle waveform, having substantially linearly sloped, gradually increasing and decreasing edges, of a frequency mnf from said n-phase sine wave signal, the fundamental frequency of said sine wave signal being f and m being an integer equal to or greater than 1, said step of synthesizing said triangle waveform comprising detecting when a segment of any of said n phases of said sine wave signal is within a predetermined angular amount from a reference crossing level, and assembling a succession of said detected segments from all phases of said sine wave to synthesize said triangle waveform; and comparing said triangle waveform to each respective phase of said sine wave signal to produce a pulse transition at each intersection of said triangle waveform and said respective phase of said sine wave signal to produce said n-phase PWM waveform.

21. The method of claim 20 wherein $m > 1$; and further comprising the step of folding said synthesized triangle waveform about first and second folding levels of equal amplitude and opposite polarity whenever said synthesized triangle waveform reaches said first and second folding levels to produce an amplitude-folded triangle waveform of frequency mnf and of peak levels determined by said first and second folding levels, said amplitude-folded triangle waveform being compared to each respective phase of said sine wave signal.

22. A method of generating an n-phase pulse width modulated signal, particularly adapted for energizing an n-phase electrical motor, from a variable frequency n-phase sine wave signal, wherein n is an integer, comprising the steps of synthesizing a triangle waveform from said n-phase sine wave signal by detecting when a segment of any of said n phases of said sine wave signal is within a predetermined angular amount from a reference crossing level and assembling a succession of said detected segments from all phases of said sine wave to synthesize a fundamental triangle waveform; generating at least one higher frequency triangle waveform by folding said fundamental triangle waveform about at least one pair of equal and opposite folding levels whenever said fundamental triangle waveform reaches said folding levels to produce an amplitude-folded triangle waveform of said higher frequency; selecting said fundamental triangle waveform or said at least one higher frequency triangle waveform as an inverse function of the frequency of said sine wave signal; and comparing the selected triangle waveform to each respective phase of said sine wave signal to produce a pulse transition at each intersection of said selected triangle waveform and said respective phase of said sine wave signal to produce said n-phase pulse width modulated signal.

23. The method of claim 22 wherein said step of selecting comprises switching from a higher frequency triangle waveform to a lower frequency triangle waveform when the frequency of said sine wave signal exceeds a predetermined amount, said switching being synchronized with the zerocrossing level of said sine wave signal.

24. Apparatus for generating an n-phase pulse width modulated (PWM) signal particularly adapted for energizing an n-phase electrical motor (wherein n is an integer), said apparatus comprising a source of n-phase sine wave signal, each phase having a fundamental frequency f; triangle waveform generating means for generating a triangle waveform of frequency nf from said n-phase sine wave signal, said triangle waveform generating means including detecting means for detecting when a segment of any of n phases of said sine wave signal is within a predetermined angular amount from a reference crossing level, and selecting means for selecting successive ones of said detected segments to synthesize said triangle waveform; amplitude folding means coupled to said selecting means to receive said triangle waveform and for folding said triangle waveform produced by said selecting means about at least a first pair of equal and opposite folding levels whenever said triangle waveform reaches either of said folding levels to produce an amplitude-folded triangle waveform of frequency mnf (wherein m>1); n comparing means provided for the n phases, respectively, of said electrical motor, each comparing means being operative to compare a triangle waveform supplied thereto to an associated phase of said sine wave signal to produce a pulse transition at each intersection of said supplied triangle waveform and said associated phase of said sine wave signal, the frequency of said transitions being determined the the frequency of said triangle waveform and the separation of said transitions being determined by the amplitude of said sine wave signal; and switch means for selectively supplying the triangle waveform of frequency nf or mnf to said n comparing means as a function of the frequency of said sine wave signal.

25. The apparatus of claim 24 wherein said switch means comprises a switching circuit having a plurality of inputs connected to receive the triangle waveform of frequencies nf and mnf, respectively; and an output for supplying one of said received triangle waveforms to said n comparing means; and frequency detecting means for detecting the frequency of said sine wave signal and for operating said switching circuit to couple a higher frequency triangle waveform to the output thereof when the frequency of said sine wave signal is relatively low and to couple a lower frequency triangle waveform to said output when said frequency of said sine wave signal is relatively high.

26. The apparatus of claim 25 wherein said switch means further comprises zero-crossing detector means for detecting when said sine wave signal crosses a zero reference level and for enabling said switching circuit to be operated by said frequency detecting means in synchronism with a detected zero crossing.

27. The apparatus of claim 24 wherein n=3; wherein said detecting means comprises a first comparator for comparing the first and second phases of said sine wave signal to produce a first binary signal when the amplitude of said first phase is greater than the amplitude of said second phase and to produce a second binary signal when the amplitude of said second phase is greater than the amplitude of said first phase, a second comparator for comparing the second and third phases of said sine wave signal to produce said first binary signal when the amplitude of said second phase is greater than the amplitude of said third phase and to produce said second binary signal when the amplitude of said third phase is greater than the amplitude of said second phase, and a third comparator for comparing said third and first phases of said sine wave signal to produce said first binary signal when the amplitude of said third phase is greater than the amplitude of said first phase and to produce said second binary signal when the amplitude of said first phase is greater than the amplitude of said third phase; and wherein said selecting means is responsive to predetermined combinations of said produced binary signals to select successive segments of said phases.

28. The apparatus of claim 27 wherein said selecting means comprises first, second and third transmission means mutually exclusively operative to pass said first, second and third phases, respectively; and first gate means for enabling said first transmission means to operate when said first and third comparators concurrently produce the same binary signals, second gate means for enabling said second transmission means to operate when said first and second comparators concurrently produce the same binary signals, and third gate means for enabling said third transmission means to operate when said second and third comparators concurrently produce the same binary signals.

29. The apparatus of claim 28 wherein each of said gate means comprises an exclusive-OR gate.

30. The apparatus of claim 24 wherein n=3; wherein said detecting means comprises a first comparator for comparing the first and second phases of said sine wave signal to transmit the higher of the instananeous amplitudes thereof, a second comparator for comparing the second and third phases of said sine wave signal to transmit the higher of the instantaneous amplitudes thereof, and a third comparator for comparing said third and first phases of said sine wave signal to transmit the higher of the instantaneous amplitudes thereof; and wherein said selecting means is operative to pass the lowest of the instantaneous amplitudes transmitted by said first, second and third comparators.

31. The apparatus of claim 30 wherein said selecting means comprises a further comparator for comparing the instantaneous amplitudes transmitted by said first, second and third comparators and for passing the lowest of said transmitted instantaneous amplitudes.

32. The apparatus of claim 24 wherein said amplitude folding means comprises at least one amplitude folding circuit including a source of folding voltage equal to one of said pair of folding levels, level increase means for increasing the average level of said triangle waveform by said folding voltage, level decrease means for decreasing the average level of said triangle waveform by said folding voltage, means for polarity-inverting the level-decreased triangle waveform relative to said received triangle waveform, first selecting means for selecting the larger of the instantaneous amplitudes of the relatively polarity-inverted level-decreased triangle waveform and the received triangle waveform, means for polarity-inverting the level-increased triangle waveform relative to said received triangle waveform, and second selecting means for selecting the smaller of the amplitude selected by said first selecting means and the amplitude of the relatively polarity-inverted level-increased triangle waveform thereby producing said amplitude-folded triangle waveform.

* * * * *